US010939161B2

(12) United States Patent
Walker

(10) Patent No.: US 10,939,161 B2
(45) Date of Patent: Mar. 2, 2021

(54) SYSTEM AND METHOD FOR LOW-LATENCY COMMUNICATION OVER UNRELIABLE NETWORKS

(71) Applicant: Vircion LLC, Cedar Park, TX (US)

(72) Inventor: Peter Anthony Walker, Cedar Park, TX (US)

(73) Assignee: Vircion LLC, Cedar Park, TX (US)

( * ) Notice: Subject to any disclaimer, the term of this patent is extended or adjusted under 35 U.S.C. 154(b) by 30 days.

(21) Appl. No.: 16/264,069

(22) Filed: Jan. 31, 2019

(65) Prior Publication Data
US 2020/0252682 A1 Aug. 6, 2020

(51) Int. Cl.
*H04N 21/44* (2011.01)
*H04N 21/845* (2011.01)
*H04N 21/647* (2011.01)
*G06N 20/10* (2019.01)

(52) U.S. Cl.
CPC ............ *H04N 21/44* (2013.01); *G06N 20/10* (2019.01); *H04N 21/64784* (2013.01); *H04N 21/8456* (2013.01)

(58) Field of Classification Search
CPC ............... H04N 21/44; H04N 21/8456; H04N 21/64784; G06N 20/10
See application file for complete search history.

(56) References Cited

U.S. PATENT DOCUMENTS

| 8,805,773 B2* | 8/2014 | Fiedler | A63F 13/358 706/62 |
| 2012/0059783 A1* | 3/2012 | Fiedler | A63F 13/358 706/46 |
| 2015/0078372 A1* | 3/2015 | Mani | H04L 1/08 370/352 |
| 2017/0374164 A1* | 12/2017 | Werner | H04L 43/087 |

FOREIGN PATENT DOCUMENTS

| WO | 2009043066 A1 | 4/2009 |
| WO | 2016030694 A1 | 3/2016 |

* cited by examiner

*Primary Examiner* — Michael C Lai
(74) *Attorney, Agent, or Firm* — Ziegler IP Law Group, LLC

(57) ABSTRACT

A method for low-latency communication from a first device to a second device over an unreliable network using at least one predictive machine learning model includes representing at least one frame of time series data at the first device; recording at least one output stream, and a plurality of external inputs from the first device in an interaction recorder of the second device detecting, at the second device, at least one lost frame of time series data; training the at least one predictive machine learning model at the first device for predictive frame regeneration; regenerating the at least one lost frame of the time series data at the second device using the at least one predictive machine learning model; and combining an output stream from an application steam with the at least one regenerated frame of time series data to obtain a modified output stream.

23 Claims, 26 Drawing Sheets

SYSTEM AND METHOD FOR LOW-LATENCY COMMUNICATION OVER UNRELIABLE NETWORKS

TECHNICAL FIELD

The present disclosure relates generally to a system and a method for low-latency communication over an unreliable network using a predictive machine learning model; moreover, the aforesaid system employs, when in operation, machine learning techniques that regenerate lost data during transmission, for example by way of regenerating, time series data from previously received time series data.

BACKGROUND

Latency is a time interval between the stimulation and response, or, from a more general point of view, a time delay between the cause and the effect of some physical change in the system being observed. Latency is physically a consequence of the limited velocity with which any physical interaction can propagate. The magnitude of this velocity is always less than or equal to the speed of light. Therefore, every physical system will experience some sort of latency, regardless of the nature of stimulation that it has been exposed to.

Low latency communication is typically performed over an unreliable network channel. The Low latency communication mainly depends on the network channel to enforce reliability that may lead to unpredictable latency as the network channel may have uncontrollable retry bounds when data is lost in transmission. This may cause message latency to have unbounded characteristics. Interactive systems such as autonomous vehicles, robotics, multiplayer video gaming, virtual reality/augmented reality, remote music jamming and telepresence system are mainly dependent on the Low latency communication for delivering control data or data generated from interaction and to the system state. To keep the communication latency as low, these systems may use unreliable packet transport. One example of such unreliable transport is Unreliable Datagram Protocol (UDP). As a result, packet loss is inevitable because of the system conditions such as congestion, interference and the physical conditions leading to bit errors in the transport medium.

Further, unreliable network protocols (e.g. UDP) do not attempt retries in the presence of packet or data loss. The logics of a sender and a receiver may have to manage any detection and recovery of the lost data. Further, data retransmission of the lost data by the sender is undesirable as this carries a high latency cost, which is equivalent to the latency in the channel.

US patent publication number US20120059783 discloses an authority over an artificial intelligence (AI) asset can be controlled among two or more processing devices running a common program over a network using a technique in which authority can be transferred. A first processing device can exercise authority over the AI asset by executing code that controls one or more actions of the AI asset according to a decision tree. The decision tree can determine whether to engage the program asset based on criteria other than a distance between the AI asset and the program asset. The first processing device can broadcast a state of the AI asset to one or more other devices running the program. If the decision tree determines that the AI asset should engage a program asset over which another processing device has authority the first processing device can relinquish authority over the AI asset and transfer authority to the other device.

PCT publication number WO2009043066 discloses a method for enhancing wide-band speech audio signals in the presence of background noise and, more particularly to a noise suppression system, a noise suppression method and a noise suppression program. More specifically, the present invention relates to low-latency single-channel noise reduction using sub-band processing based on masking properties of the human auditory system.

US patent publication number US20170374164 discloses a method for transmission and low-latency real-time output and/or processing of an audio data stream that is transmitted from at least one transmitter to at least one receiver over a jittering transmission path. The method includes a calibration for determining a distribution of latencies in the transmission of packets of the audio data stream, whereby a group of packets of the audio data stream is used as calibration packets and wherein a reference time grid and an offset of a fastest calibration packet are determined. Then, a shift of an output time grid for audio output and/or processing, based on the reference time grid and the determined offset of the fastest calibration packet, and the audio packets of the audio data stream are provided according to the output time grid for audio output and/or processing.

PCT publication number WO2016030694 discloses a system for transmitting low latency, synchronised audio that includes an audio source, a processor, a controller and a sink zone with a DAC. Particularly, the processor is capable of selectively resampling the audio source in order to output a data packet for transmission to the sink zone that has a maximised payload size while packet frequency remains a whole number. However, none of the above prior art effectively detect the lost packet/data during transmission and regenerate the lost data at a receiver while keeping latency low.

Therefore, in light of the foregoing discussion, there exists a need to overcome the aforementioned drawbacks in existing approaches for low-latency communication from a first device to a second device over unreliable networks to regenerate lost data during transmission while keeping latency low.

SUMMARY

The present disclosure provides a method for low-latency communication from a first device to a second device over an unreliable network using at least one predictive machine learning model, characterized in that the method comprising: representing at least one frame of time series data at the first device, wherein the time series data is a series of data points indexed in time order;
recording at least one output stream, a metadata associated with the at least one output stream, and a plurality of external inputs from the first device in an interaction recorder of the second device, wherein the at least one output stream comprises the at least one frame of time series data;
segmenting a background area of an image into at least one background area stream, wherein the at least one background area stream is captured from a plurality of users;
compressing at least one character centered portion of the image into a character focus stream for enabling an output image to be treated as two streams;
training the at least one predictive machine learning model at the first device for a predictive frame regeneration by providing the at least one output stream from the interaction recorder as an input;

transmitting the results or interactions in a time series to the second device, from the first device;
detecting at least one lost frame of time series data using the at least one predictive machine learning model, at the second device;
regenerating the at least one lost frame of time series data at the second device using the at least one predictive machine learning model based on the at least one output stream to obtain at least one regenerated frame of time series data; and
comparing an application stream from a stream of data obtained from the unreliable network with the at least one regenerated frame of time series data obtained from the at least one predictive machine learning model at the second device using a decision engine, wherein the application stream comprises the at least one frame of time series data.

It will be appreciated that the aforesaid present method is not merely a "method of doing a mental act", but has a technical effect in that the method functions as a form of technical control using machine learning or statistical analysis of a technical artificially intelligent system. The method involves regenerating at least one lost frame of the time series data to solve the technical problem of enabling the low-latency communication while recovering the lost data of the time series data during transmission.

The present disclosure also provides a first device that enables low-latency communication with a second device over an unreliable network using at least one predictive machine learning model, characterized in that the first device comprising:
one or more processors;
one or more non-transitory computer-readable mediums storing one or more sequences of instructions, which when executed by the one or more processors, cause:
representing at least one frame of time series data at the first device, wherein the at least one frame of time series data is a series of data points indexed in time order;
recording at least one output stream, a metadata associated with the at least one output stream, and a plurality of external inputs in an interaction recorder of the second device, wherein the at least one output stream comprises the at least one frame of time series data;
segmenting a background area of an image into at least one background area stream, wherein the at least one background area stream is captured from a plurality of users;
compressing at least one character centered portion of the image into a character focus stream for enabling an output image to be treated as two streams;
training the at least one predictive machine learning model for predictive frame regeneration by providing the at least one output stream from the interaction recorder as an input; and
transmitting results or interactions in a time series to the second device.

The present disclosure also provides a second device that enables low-latency communication with a first device over an unreliable network using at least one predictive machine learning model, characterized in that the second device comprising:
one or more processors;
one or more non-transitory computer-readable mediums storing one or more sequences of instructions, which when executed by the one or more processors, cause:
receiving the results or interactions in the time series, from the first device, wherein the results or interactions comprises a state space representation or the modified output stream of the at least one frame of time series data, wherein the state space representation comprises interactions between the first device and the second device;
detecting at least one lost frame of time series data using the at least one predictive machine learning model;
regenerating the at least one lost frame of the time series data using the at least one predictive machine learning model based on the at least one output stream to obtain at least one regenerated frame of time series data; and
comparing an application stream from a stream of data obtained from the unreliable network with the at least one regenerated frame of time series data obtained from the at least one predictive machine learning model using a decision engine, wherein the application stream comprises the at least one frame of time series data.

The present disclosure also provides a computer program product comprising instructions to cause the first device and the second device to carry out the above described method.

Embodiments of the present disclosure substantially eliminate or at least partially address the aforementioned drawbacks in existing approaches for low-latency communication from a first device to a second device over unreliable networks to regenerate lost data during transmission while keeping latency low.

Additional aspects, advantages, features and objects of the present disclosure are made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
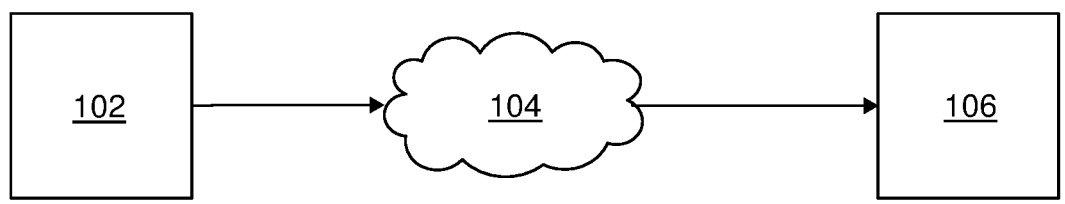
FIG. 1 is a schematic illustration of a low-latency peer-to-peer communication in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present disclosure provides a method for low-latency communication from a first device to a second device over an unreliable network using at least one predictive machine learning model, characterized in that the method comprising:

representing at least one frame of time series data at the first device, wherein the time series data is a series of data points indexed in time order;

recording at least one output stream, a metadata associated with the at least one output stream, and a plurality of external inputs from the first device in an interaction recorder of the second device, wherein the at least one output stream comprises the at least one frame of time series data;

segmenting a background area of an image into at least one background area stream, wherein the at least one background area stream is captured from a plurality of users;

compressing at least one character centered portion of the image into a character focus stream for enabling an output image to be treated as two streams;

training the at least one predictive machine learning model at the first device for a predictive frame regeneration by providing the at least one output stream from the interaction recorder as an input;

transmitting the results or interactions in a time series to the second device, from the first device;

detecting at least one lost frame of time series data using the at least one predictive machine learning model, at the second device;

regenerating the at least one lost frame of time series data at the second device using the at least one predictive machine learning model based on the at least one output stream to obtain at least one regenerated frame of time series data; and comparing an application stream from a stream of data obtained from the unreliable network with the at least one regenerated frame of time series data obtained from the at least one predictive machine learning model at the second device using a decision engine, wherein the application stream comprises the at least one frame of time series data.

The present method thus enables the second device to regenerate at least one lost frame of the time series data using the at least one predictive machine learning model. The present method thus allows the first device to record at least one output stream, a metadata associated with the at least one output stream, and a plurality of external inputs in an interaction recorder. Using the recorded data, the first device trains the at least one predictive machine learning model to regenerate the missing data. The present method considers the at least one frame of time series data passed in the interaction recorder to be time series in nature and sent as quanta in a packet that is called as frames. When a frame is lost in transmission, the second device detects the lost frame of the time series data, and by using the frames of time series data from previously received frames, the at least one predictive machine learning model may generate the lost frame of the time series data. The at least one predictive machine learning model may generate a confidence score for the regenerated frame and is communicated back to the second device. The confidence score may be used to trigger a need for sending an updated predictive machine learning model. Such updated predictive machine learning model may be transmitted out-of-band over a reliable channel.

Additionally, when the predictive confidence score is low, the first device may provide a new predictive machine learning model. The first device continuously trains the new predictive machine learning model based on interactions observed between the first device and the second device.

The first device may be a server or a cloud server. The second device may be a client device. Further, the first device may train multiple predictive machine learning models concurrently based on different criteria such as the first device's computational capability and a number of frames provided as input. The first device may adaptively select a predictive machine learning model to use based on conditions and resources available at the first device, such as computational power and a number of frames cached. The regeneration of the lost frame of the time series data using the at least one predictive machine learning model approach may enable low-latency as the second device does need to retry or delay the transmission of a packet to carry redundancy information such as Forward Error Correction Codes (FEC).

In an embodiment, the first device and the second device are part of a peer to peer system and the second device may be an autonomous vehicle, a robot, a multiplayer video gaming, a virtual reality (VR)/augmented reality (AR) device, a remote music jamming or a telepresence system.

It will be appreciated that the aforesaid present method is not merely a "method of doing a mental act", but has a technical effect in that the method functions as a form of technical control using machine learning or statistical analysis of a technical artificially intelligent system. The method involves regenerating at least one lost frame of the time series data to solve the technical problem of enabling the low-latency communication while recovering the lost data of the time series data during transmission.

According to an embodiment, the method comprises combining an output stream from the application stream with the at least one regenerated frame of time series data at the second device to obtain a modified output stream.

According to an embodiment, the results or interactions in the time series comprises a state space representation or the modified output stream of the at least one frame of time series data. The state space representation comprises interactions between the first device and the second device.

According to another embodiment, the training of the at least one predictive machine learning model comprises generating a plurality of predictive machine learning models based on a number of frames in a sequence and the second device computing capability.

According to yet another embodiment, the plurality of predictive machine learning models comprises a stream source classification model. The stream source classification model is selected by identifying the at least one predictive machine learning model to be used when an input is not tagged as a particular type.

According to yet another embodiment, the method comprises providing a state-space representation and the interaction between the first device and the second device as an input for training the at least one predictive machine learning model and generating a plurality of predictive machine learning model based on the input.

According to yet another embodiment, the method comprises selecting a suitable predictive machine learning model for the predictive frame regeneration based on the second device's computing capability and a quality of the at least one regenerated frame of time series data.

According to yet another embodiment, the predictive frame regeneration comprises the at least one background area stream and the character focus stream. Both the background area stream and the character focus stream may be used to train the predictive frame regeneration by feeding content from game plays that have been stored or in progress.

According to yet another embodiment, the at least one lost frame of the time series data is detected using a frame loss indicator.

According to yet another embodiment, the at least one lost frame of the time series data is detected using a frame loss indicator. The second device may use the frame loss indicator to trigger the generation of fill frame. The lost frame signal may be provided when an audio playout queue is empty or when the packet sequence number indicates that a packet was lost in transmission.

According to yet another embodiment, the method comprises detecting a packet lost in the at least one frame of time series data by a packet sequence number or by using a mean or a median an inter-arrival time. Using the inter-arrival time for detecting a packet lost may ensure the stability of the second device behavior and the low latency as effects of jitter is filtered. Also, the second device may trigger the regeneration of the lost frame of the time series data with the at least one predictive machine learning model by detecting a packet lost by the packet sequence numbers or by using the mean or median inter-arrival time.

According to yet another embodiment, the method comprises calibrating an acoustic model with a decoder, wherein the acoustic model enables the decoder to regenerate the at least one lost frame of the time series data from lost data. The acoustic model may enable the decoder to generate lost audio frames that are at best, and reduce the noise effects from the lost data. The acoustic model may not produce audio that is authentic and specific (i.e. high fidelity) to the nature of an audio stream that is happening. The second device may use techniques like Forward Error Encoding (FEC), where data from the previous packet is embedded in a subsequent packet. The data may be used by the decoder to regenerate the lost audio frame for the lost packet when the subsequent packet arrives. The present method, however, introduces latency, as the decoder may have to wait for the FEC packet to determine how to proceed. If FEC is not used, then the decoder generates a replacement or fill frame when an audio playout side requests the next frame.

The acoustic module may be static. As the packet loss rate increases, the ability of the acoustic model to produce good quality replacement frames diminishes rapidly and an audio quality desired by the user also significantly diminishes. The acoustic model is not context or content aware and therefore the acoustic model may not generate frames that are best suited to content in the audio stream. The acoustic model is defined as a model that is used in automatic speech recognition to represent the relationship between an audio signal and the phonemes or other linguistic units that make up speech. The acoustic model is learned from a set of audio recordings and their corresponding transcripts.

According to yet another embodiment, the method comprises producing fill-frames using a different number of input frames as an input vector to the at least one predictive machine learning model to generate an output frame, wherein the output frame is of a different frame size. The at least one predictive machine learning model may be trained with specific stream content, for example, a saxophone, a drum, and the like.

According to yet another embodiment, the fill frames in a frame queue are replaced by actual frames that arrive later for improving an accuracy of subsequent frames to be generated using real-time time series data.

According to yet another embodiment, the method comprises training the at least one predictive machine learning model with specific stream content. The specific audio contents may be a saxophone, a drum and the like.

According to yet another embodiment, the method comprises associating a bundle model with the specific stream content, different input frame sizes, and output frames into one package based on the second device's computing capability.

In an embodiment, the at least one predictive machine learning model includes a bundle model.

In another embodiment, a plurality of bundle models may be created by a second device in one package called an ensemble. Each bundle model in the ensemble is associated with a different classes of time series data stream, and each bundle model is trained to accept a range of input frame sizes and output frame sizes. At the frame generation, a subset of models selected from the package is initially used to generate fill frame and the package is selected based on the second device's computing capability such as CPU power, a machine learning computation engine, and the like. Each bundle model generates both an audio data and a confidence score of the quality of audio data being produced. A final audio output used is based on the confidence score of the bundle model about the generated audio data. If the second device has limited computing capability, a smaller set of bundle models or less complex bundle models are selected for use. Once a bundle model generates frames with a high confidence score beyond a specified confidence threshold, that bundle model is reused in a subsequent fill-frame generation. Periodic reset of the selected bundle model is performed so that the second device may retest the package models to analyze whether a better fitting model can be found.

The second device may work with only compute latency and no buffering latency as the fill frame generation has no buffering. The frame is generated computationally. As long as the at least one predictive machine learning model may complete its computation in the time for the playout queue to consume the generated frame, no latency lag is incurred. By dynamically trimming the at least one predictive machine learning model selection to match the computational capability of the second device that generates the frame, the second device may ensure that frame generation is guaranteed to complete within the time.

According to yet another embodiment, the method comprises generating a confidence score of a quality of the at least one regenerated frame of time series data regenerated by the at least one predictive machine learning model, wherein the at least one regenerated frame of time series data with high confidence score beyond a specified confidence threshold is reused in a subsequent fill-frame generation. The final output is based on the confidence score of a quality of the regenerated frame of time series data regenerated by the at least one predictive machine learning model. If the second device has limited computing capability, a smaller set of predictive machine learning models or less complex predictive machine learning models may be selected for use. A periodic reset of the selected predictive machine learning model may be performed so that the second device may retest the package models to determine whether a better model may be available or not.

In an embodiment, when the data sent between communicating parties (e.g. the first device and the second device) carries the time-series data, and where the signal has a structure such that the at least one predictive machine learning model may be trained to predict and regenerate data lost in transmission, this present method may produce the lowest latency between the communicating parties.

Some example applications or systems that can be impacted by this present method are provided as follows:

In the Low latency music and audio transmission system, instruments and music are generalized such that the at least one predictive machine learning models may be trained and the second device may predict or generate the next frame of audio once the Low latency music and audio transmission system has received an earlier frame of the audio.

In autonomous and remote vehicle control system, for example, in a closed control loop system with fast-moving vehicles, a position, and control information is communicated with low-latency. With the at least one predictive machine learning model, the vehicle control and data may be communicated as the time series data among vehicles, or to a network controller at a central or edge node. Both the vehicle and the controller may need to regenerate data lost in transmission over an unreliable network. An online system that learns and refines the at least one predictive machine learning model from the time series control/data passed may allow the autonomous and remote vehicle control system to use an unreliable channel/network for communication and realize low-latency communication.

High-frequency trading system may depend on low-latency. The high-frequency trading systems may attempt to address a need for the low-latency by being placed geographically close to the trading center data feed while using a reliable transport. Stock data is fundamentally time-series and the at least one predictive machine learning model to regenerate the lost data may be used to extend a physical distance from the trading data feed.

In Virtual Reality (VR) and Augmented Reality (AR) system, the VR/AR system may depend on low-latency to ensure that consumers have an optimal experience. When the AR/VR system may involve data (e.g. time series data) from a source remote to a headset/wearable of the AR/VR system, the data may be communicated with low-latency. Most consumer home environments are so noisy as the communication channel/network is unreliable. Additionally, most data transmitted for VR/AR may be an audio, a video, a position, sensory and may be communicated in a time series format. The at least one predictive machine learning model may be trained to regenerate the lost data while preserving the low-latency property.

In low Latency interactive video system, video such as occurred in cloud-video gaming, and the video game is controlled by users interacting remotely to the interactive video system. In an embodiment, the first device may execute the video game and produce the video that is streamed to the users. The interactive video system may generate gameplay audio that is streamed to the users. The gameplay audio and the video may be streamed at low-latency over an unreliable network. A user's device (i.e. the second device) may receive the gameplay audio and the video, decode and plays the gameplay audio and the video on the user's device. Simultaneously, the user may react to the gameplay audio or the video content using an input device, such as a game controller, a keyboard, a mouse, a VR headset, motion sensors, etc., which may communicate game control signals at low-latency to the first device. Both directions of communication (i.e. from the first device to the user device and from the user device to the first device) require low-latency, which is often over an unreliable network.

The present disclosure also provides a first device that enables low-latency communication with a second device over an unreliable network using at least one predictive machine learning model, characterized in that the first device comprising:
one or more processors;
one or more non-transitory computer-readable mediums storing one or more sequences of instructions, which when executed by the one or more processors, cause:
representing at least one frame of time series data at the first device, wherein the at least one frame of time series data is a series of data points indexed in time order;
recording at least one output stream, a metadata associated with the at least one output stream, and a plurality of external inputs in an interaction recorder of the second device, wherein the at least one output stream comprises the at least one frame of time series data;
segmenting a background area of an image into at least one background area stream, wherein the at least one background area stream is captured from a plurality of users;
compressing at least one character centered portion of the image into a character focus stream for enabling an output image to be treated as two streams;
training the at least one predictive machine learning model for predictive frame regeneration by providing the at least one output stream from the interaction recorder as an input; and
transmitting results or interactions in a time series to the second device.

The advantages of the present first device are thus identical to those disclosed above in connection with the present method and the embodiments listed above in connection with the present method apply mutatis mutandis to the present first device.

In an example embodiment, a video output of a game that is rendered in the first device may be predicted as the game is finite and defines or limits what is to be generated and the users may often follow familiar or rail tracks, and along these paths, the rendering has large portions of scenes that are of the same view. The large portions of the video image may be predicted using the at least one predictive machine learning model, with high confidence. These video images may often include background textures over which gameplay is layered. The parts of the screen that occupy characters are usually smaller. The video image is segmented into the background area stream and compressed separately from the character centered portions that enable the output video image to be treated logically as two video streams. The background area stream may be compressed and streamed with low-latency supported by the predictive frame regeneration. The at least one predictive machine learning model may be trained using the background area streams that are captured from a large number of users.

Both the background area stream and the character focus stream may be used to train the predictive frame regeneration by feeding content from a gameplay that has been stored or in progress. In an embodiment, the statistical or predictive machine learning model is calibrated, trained or optimised using at least one of historical atmospheric contaminant data, live atmospheric contaminant data or simulations of the atmospheric contaminant risk.

In an embodiment, the predictive frame regeneration comprises the at least one background area stream and the character focus stream. Both the background area stream and the character focus stream may be used to train the predictive frame regeneration by feeding content from game plays that have been stored or in progress.

According to an embodiment, the one or more processors is further configured to train the at least one predictive machine learning model with specific stream content. The specific stream content may be a saxophone, a drum and the like.

The present disclosure also provides a second device that enables low-latency communication with a first device over an unreliable network using at least one predictive machine learning model, characterized in that the second device comprising:
one or more processors;
one or more non-transitory computer-readable mediums storing one or more sequences of instructions, which when executed by the one or more processors, cause:
receiving the results or interactions in the time series, from the first device, wherein the results or interactions comprises a state space representation or the modified output stream of the at least one frame of time series data, wherein the state space representation comprises interactions between the first device and the second device;
detecting at least one lost frame of time series data using the at least one predictive machine learning model;
regenerating the at least one lost frame of the time series data using the at least one predictive machine learning model based on the at least one output stream to obtain at least one regenerated frame of time series data; and
comparing an application stream from a stream of data obtained from the unreliable network with the at least one regenerated frame of time series data obtained from the at least one predictive machine learning model using a decision engine, wherein the application stream comprises the at least one frame of time series data.

The advantages of the present second device are thus identical to those disclosed above in connection with the present method and the embodiments listed above in connection with the present method apply mutatis mutandis to the present second device.

The second device may detect the lost frame of the time series data using a frame of time series data from previously received frames. The at least one predictive machine learning model may generate the lost frame of the time series data. The at least one predictive machine learning model may generate a confidence score for the regenerated frame and is communicated back to the second device. The at least one predictive machine learning model-based approach for regeneration of lost frame of time series data may enable low-latency as the second device does need to retry or delay the transmission of a packet to carry redundancy information such as Forward Error Correction Codes (FEC).

According to an embodiment, the one or more processors is further configured to combine an output stream from the application stream with the at least one regenerated frame of time series data to obtain a modified output stream.

According to another embodiment, the at least one lost frame of the time series data is detected using a frame loss indicator.

According to yet another embodiment, the one or more processors is further configured to calibrate an acoustic model into a decoder, wherein the acoustic model enables the decoder to regenerate the at least one lost frame of the time series data from lost data. In an example embodiment, in Low latency music and audio transmission system, the acoustic model may enable the decoder to generate lost audio frames that are at best, and reduce the noise effects from the lost data. The acoustic model may not produce audio that is authentic and specific (i.e. high fidelity) to the nature of an audio stream that is happening. The second device may use techniques like Forward Error Encoding (FEC), where data from the previous packet is embedded in a subsequent packet. The data may be used by the decoder to regenerate the lost audio frame for the lost packet when the subsequent packet arrives. The present method, however, introduces latency, as the decoder may have to wait for the FEC packet to determine how to proceed. If FEC is not used, then the decoder generates a replacement or fill frame when an audio playout side requests the next frame.

The acoustic module may be static. As the packet loss rate increases, the ability of the acoustic model to produce good quality replacement frames diminishes rapidly and an audio quality desired by the user also significantly diminishes. The acoustic model is not context or content aware and therefore the acoustic model may not generate frames that are best suited to content in the audio stream. The acoustic model is defined as a model that is used in automatic speech recognition to represent the relationship between an audio signal and the phonemes or other linguistic units that make up speech. The acoustic model is learned from a set of audio recordings and their corresponding transcripts.

According to yet another embodiment, the one or more processors is further configured to produce fill-frames using a different number of input frames as an input vector to the at least one predictive machine learning model to generate an output frame, wherein the output frame is of a different frame size. The at least one predictive machine learning model may be trained with specific stream content, for example, a saxophone, a drum, and the like.

According to yet another embodiment, the one or more processors is further configured to associate a bundle model with the specific stream content, different input frame sizes, and output frames into one package based on its computing capability.

In an embodiment, the at least one predictive machine learning model includes a bundle model.

In another embodiment, the second device creates a plurality of bundle models in one package called an ensemble. Each bundle model in the ensemble is associated with a different classes of time series data stream, and each bundle model is trained to accept a range of input frame sizes and output frame sizes. At the frame generation, a subset of models selected from the package is initially used to generate fill frame and the package is selected based on the second device's computing capability such as CPU power, a machine learning computation engine, and the like. Each bundle model generates both an audio data and a confidence score of the quality of audio data being produced. A final audio output used is based on the confidence score of the bundle model about the generated audio data. If the second device has limited computing capability, a smaller set of bundle models or less complex bundle models are selected for use. Once a bundle model generates frames with a high confidence score beyond a specified confidence threshold, that bundle model is reused in a subsequent fill-frame generation. Periodic reset of the selected bundle model is performed so that the second device may retest the package models to analyze whether a better fitting model can be found.

The second device may work with only compute latency and no buffering latency as the fill frame generation has no buffering. The frame is generated computationally. As long as the at least one predictive machine learning model may complete its computation in the time for the playout queue to consume the generated frame, no latency lag is incurred. By dynamically trimming the at least one predictive machine learning model selection to match the computational capability of the second device that generates the frame, the second device may ensure that frame generation is guaranteed to complete within the time. In an embodiment, the second device further comprises training the at least one predictive machine learning model with specific stream content. The specific stream content may be a saxophone, a drum or the like.

According to an embodiment, the one or more processors is further configured to generate a confidence score of a quality of the at least one regenerated frame of time series data regenerated by the at least one predictive machine learning model, wherein the at least one regenerated frame of time series data with high confidence score beyond a specified confidence threshold is reused in a subsequent fill-frame generation.

The present disclosure also provides a computer program product comprising instructions to cause the first device and the second device to carry out the above described method.

The advantages of the present computer program product are thus identical to those disclosed above in connection with the present method and the embodiments listed above in connection with the present method apply mutatis mutandis to the computer program product.

Embodiments of the present disclosure may enable the second device to regenerate at least one lost frame of the time series data based on the at least one output stream using the at least one predictive machine learning model. Embodiments of the present disclosure may thus allow the first device to record at least one output stream, a metadata associated with at least one output stream, and a plurality of external inputs from the first device in an interaction recorder. Using the recorded data, the first device trains the at least one predictive machine learning model to regenerate the missing data. Embodiments of the present disclosure may consider the at least one frame of time series data passed in the interaction recorder to be time series in nature and send as quanta in a packet that is called as frames. When a frame is lost in transmission, embodiments of the present disclosure may enable the second device to detect the lost frame of the time series data, and by using the frames of time series data from previously received frames, the at least one predictive machine learning model may generate the lost frame of the time series data.

DETAILED DESCRIPTION OF THE DRAWINGS

FIG. 1 is a schematic illustration of a low-latency peer-to-peer communication in accordance with an embodiment of the present disclosure. The low-latency peer-to-peer communication comprises a first device 102, an internet or a network 104, and a second device 106. The internet or the network 104 may be an unreliable network channel. The function of the above parts as has been described above.

Figure 2:
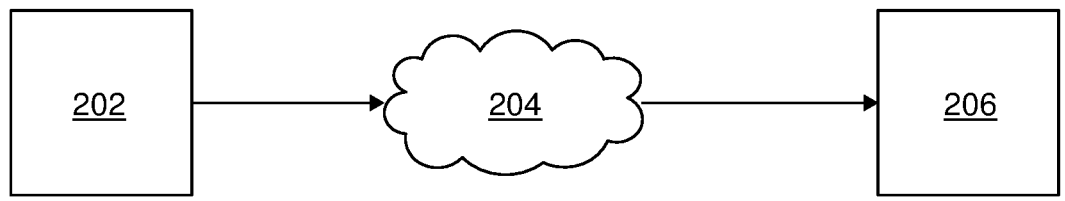
FIG. 2 is a schematic illustration of a low-latency server to client device communication in accordance with an embodiment of the present disclosure.

FIG. 2 is a schematic illustration of a low-latency server to client device communication in accordance with an embodiment of the present disclosure. The low-latency device to device communication comprises a server 202 (e.g. a first device), an internet or a network 204, and a client device 206 (e.g. a second device). The internet or the network 204 may be an unreliable network channel. The function of the above parts as has been described above.

Figure 3:
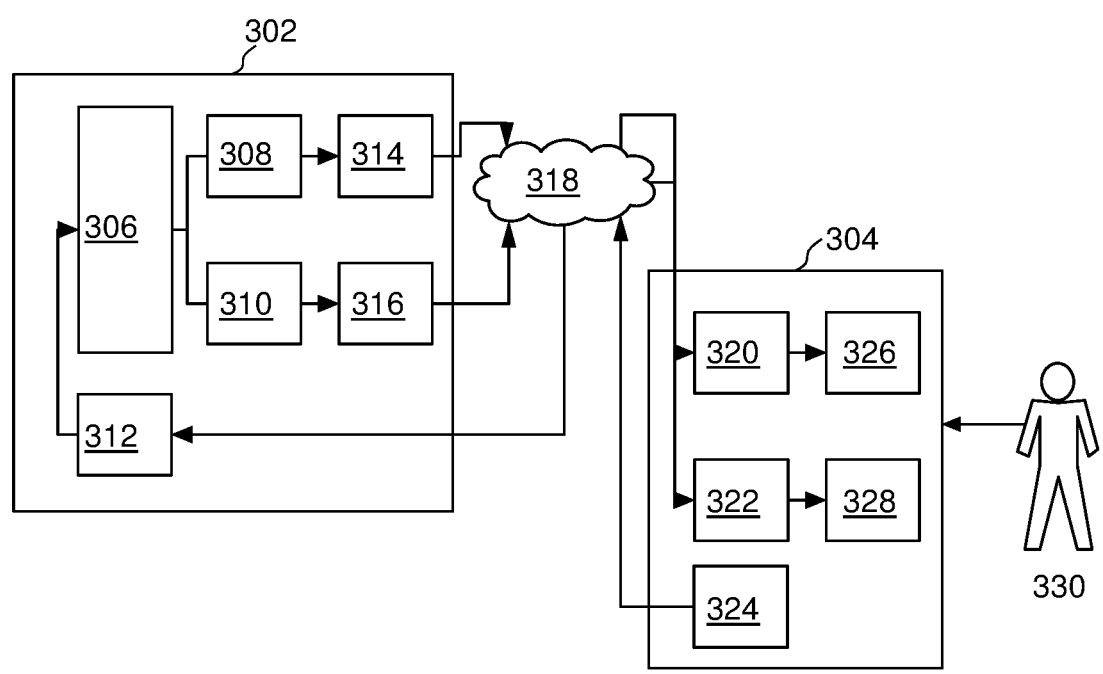
FIG. 3 is a schematic illustration of a cloud game interactive system that comprises a first device and a second device in accordance with an embodiment of the present disclosure.

FIG. 3 is a schematic illustration of a cloud game interactive system that comprises a first device and a second device in accordance with an embodiment of the present disclosure. The first device 302 comprises a game execution system 306 that executes a game, a video output 308 that outputs a video of the game, an audio output 310 that outputs an audio of the game, a first game input control 312 that control the game based on control information received from the second device 304, a video encoder and streamer 314 that encodes the video of the game for streaming it, and an audio encoder and streamer 316 that encodes the audio of the game for streaming it. The second device 304 comprises a video stream decoder 320 that decodes the video stream of the game, an audio stream decoder 322 that decodes the audio stream of the game, a game input controls 324 that provides the control information to control the game, a video output and display 326, and an audio output 328. The first device 302 is communicated with the second device 304 over an unreliable network 318. A user 330 may interact with the second device 304 to provide control information to the first device 302. The function of the other parts as has been described above.

Figure 4:
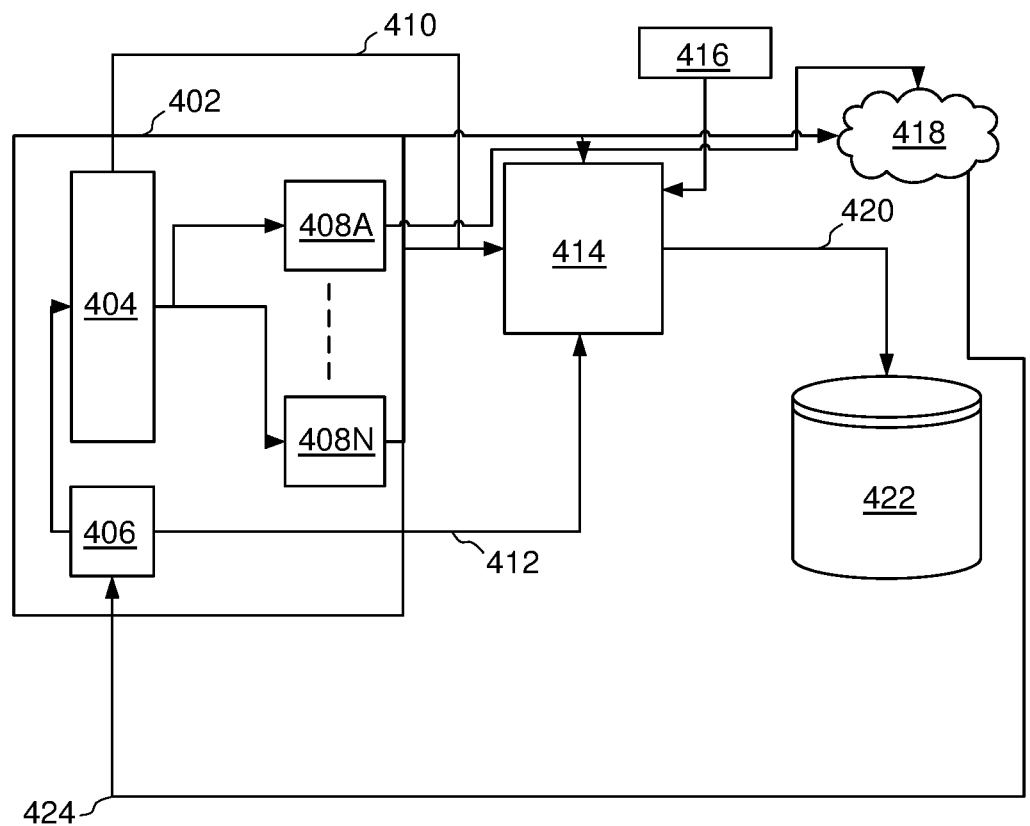
FIG. 4 is a schematic illustration of the cloud game interactive system that comprises an interaction recorder in accordance with an embodiment of the present disclosure.

FIG. 4 is a schematic illustration of the cloud game interactive system that comprises an interaction recorder in accordance with an embodiment of the present disclosure. The cloud game interactive system 402 comprises an interaction execution system 404, at least one predictive machine learning model 406, one or more output streams 408A-408N, a state space representation 410, an input stream 412, an interaction recorder 414, metadata 416, an internet or a network 418, a bundle of streams 420, a recorded state space representation 422 and an external input 424. The interaction execution system 404 executes the input stream 412 with at least one predictive machine learning model 406 and outputs the one or more output streams 408A-408N and the state space representation 410. The one or more output streams 408A-408N comprises a frame of time series data. The interaction recorder 414 records the one or more output streams 408A-408N, the state space representation 410, the input stream 412, and the metadata 416 and outputs the bundle of streams 420 and the bundle of streams 420 may include one or more frame of time series data. The one or more frame of time series data is stored in the recorded state space representation 422. The function of the other parts as has been described above.

Figure 5:
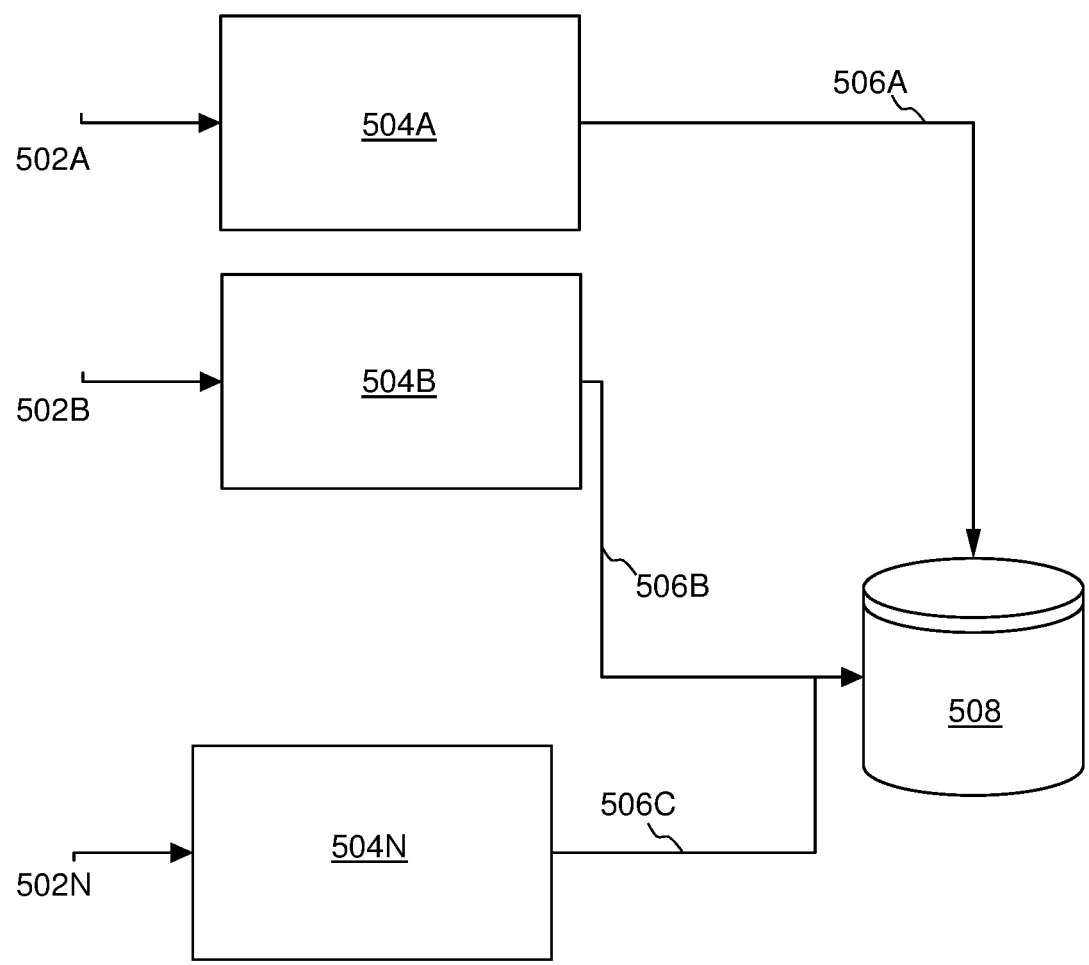
FIG. 5 is a schematic illustration of a multi-interactive application instance system that comprises an interaction recorder in accordance with an embodiment of the present disclosure.

FIG. 5 is a schematic illustration of a multi-interactive application instance system that comprises an interaction recorder in accordance with an embodiment of the present disclosure. The multi-interactive application instance system comprises one or more external input 502A-502N, one or more application with interaction recorder 504A-504N, one or more bundle of streams 506A-506C, and a network connected/recorded state space representation 508. The multi-interactive application instance system may learn user response by analysing a rendered output video of a first device, and, or an instantaneous application state, as input to at least one predictive machine learning model. The interactive application state-variables represents a unique output that renders at least one frame of time series data (e.g. the audio and video) being generated. The state variables may describe the state space representation of the closed-loop control defined by the user's interaction with the application that drives the creation of the audio and video. The state space representation may be smaller than the at least one frame of time series data and therefore represents a more efficient form of data for training the at least one predictive machine learning model. The state space representation may also be sent to a second device. With the state of the game controller as input, along with the application state, the first device may speculatively generate at least one lost frame of the time series data at the second device. The speculative generation of at least one lost frame of the time series data may create even a lower-latency interaction as the frames are produced at the second device. Subsequent states or frames received from the first device may be used to adjust the speculative generator based on correctness of its prediction. The function of the other parts as has been described above.

Figure 6:
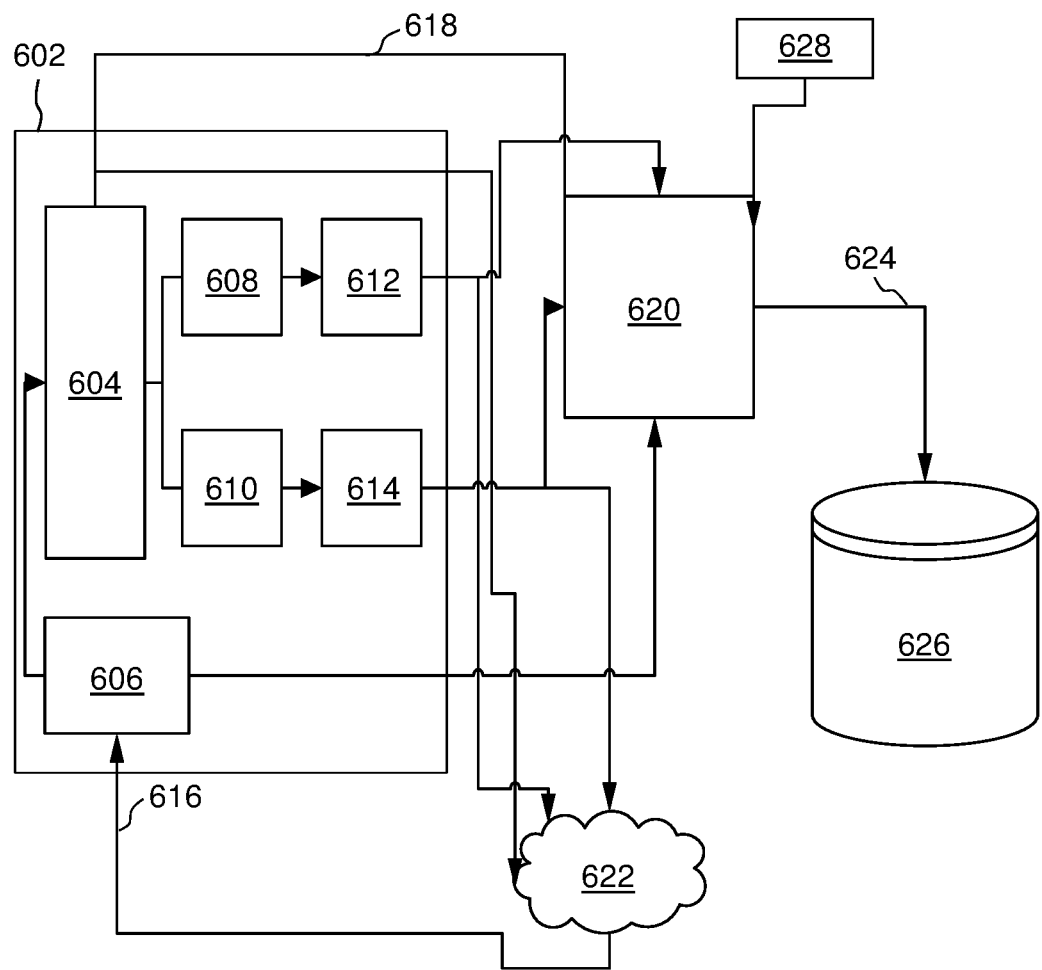
FIG. 6 is a schematic illustration of a first device with the interaction recorder in accordance with an embodiment of the present disclosure.

FIG. 6 is a schematic illustration of a first device 602 with the interaction recorder in accordance with an embodiment of the present disclosure. The first device 602 comprises a game execution system 604, a game input controls 606, a video output 608, an audio output 610, a video encoder and streamer 612, an audio encoder and streamer 614, an external input 616, a state space representation 618, an interaction recorder 620, an internet or a network 622, a bundle of streams 624, a network connected recorded state space representation store 626, and metadata 628. The game input controls 606 obtains the external input 616 from the low-latency communication from the first device 602 to a second device over an unreliable network. The game input controls 606 detects a lost frame of the time series data and regenerates the lost frame of the time series data using at least one predictive machine learning model. The game execution system 604 executes the regenerated lost frame of time series data and outputs the video output 608, the audio output 610, and the state space representation 618. The video output 608 and the audio output 610 are encoded in the video encoder and streamer 612 and the audio encoder and streamer 614. The interaction recorder 620 records the encoded video, the encoded audio, the metadata 628 and the state space representation 618 then outputs the bundle of streams 624. The bundle of streams 624 is stored in the network connected/recorded state space representation store 626. The function of the other parts as has been described above.

Figure 7:
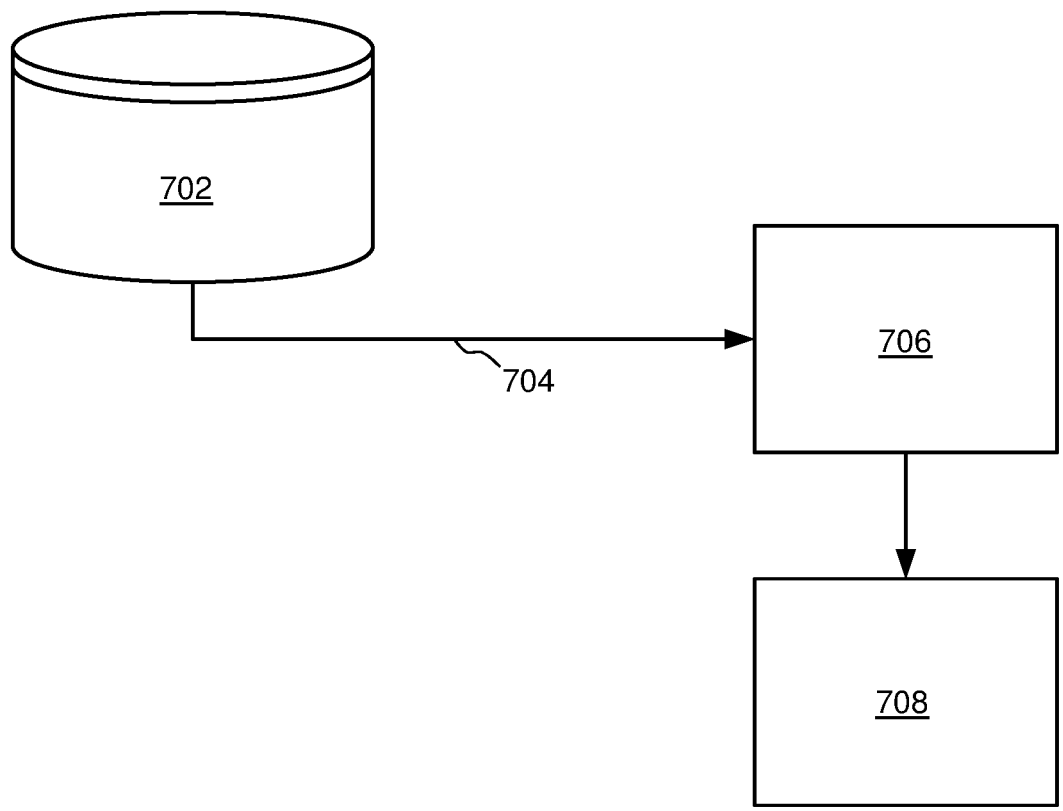
FIG. 7 is a schematic illustration of at least one predictive machine learning model that is trained using at least one frame of time series data from interaction recorder in accordance with an embodiment of the present disclosure.

FIG. 7 is a schematic illustration of at least one predictive machine learning model that is trained using at least one frame of time series data from interaction recorder in accordance with an embodiment of the present disclosure. The at least one predictive machine learning model obtains input from a network connected/recorded state space representation store 702. Then the state space presentation 704 is used to train the at least one predictive machine learning model 706 to obtain a trained predictive machine learning model 708 to regenerate a lost frame of the time series data. The function of the other parts as has been described above.

Figure 8:
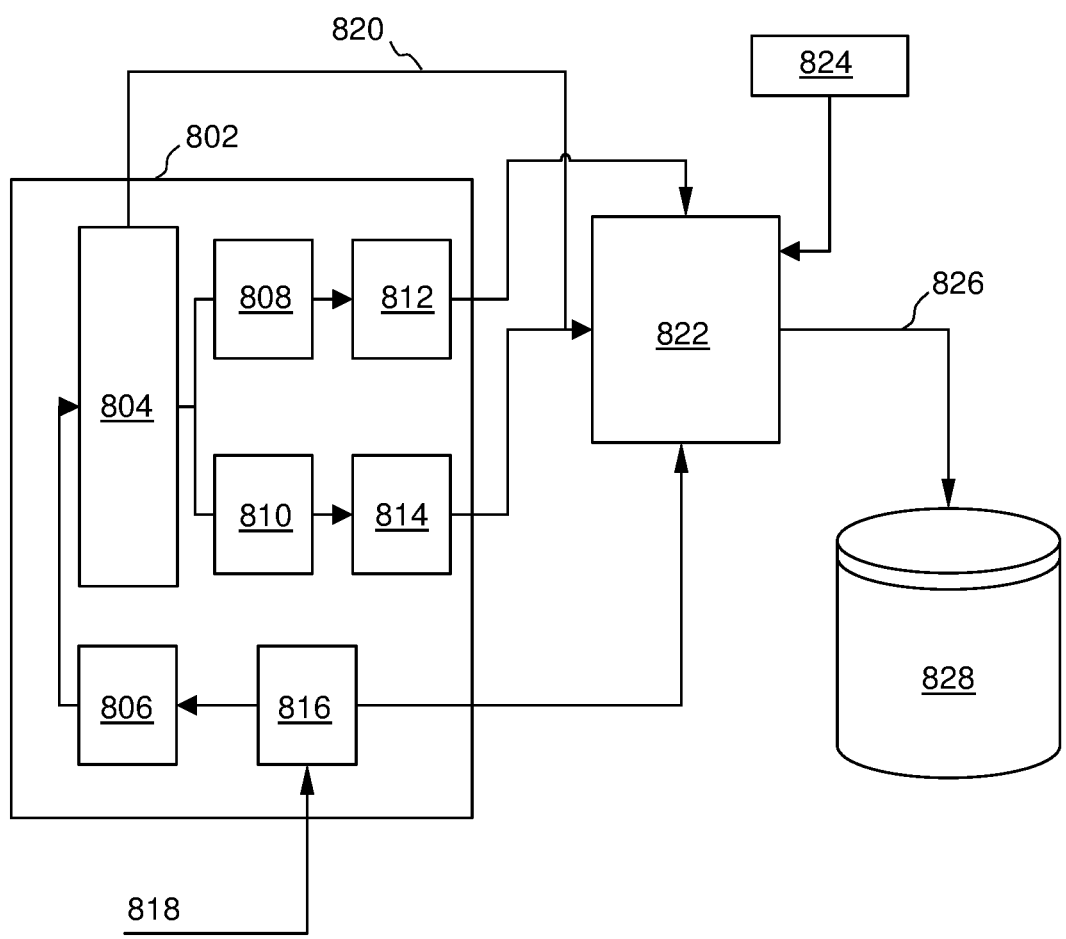
FIG. 8 is a schematic illustration of a first device with an interaction recorder in accordance with an embodiment of the present disclosure.

FIG. 8 is a schematic illustration of a first device 802 with an interaction recorder 822 in accordance with an embodiment of the present disclosure. The first device 802 comprises a game execution system 804, an input loss detection and regeneration model 806 (e.g. at least one predictive machine learning model), a video output 808, an audio output 810, a video encoder and streamer 812, an audio encoder and streamer 814, an input decoder 816, an external input 818, a state space representation 820, the interaction recorder 822, metadata 824, a bundle of streams 826, and a state space representation store 828. The input decoder 816 decodes the external input 818. The input loss detection and regeneration model 806 obtains a decoded external input from the input decoder 816. The input loss detection and regeneration model 806 detects a lost frame of the time series data and regenerates the lost frame of the time series data. The game execution system 804 executes the regenerated lost frame of the time series data and outputs the video output 808, the audio output 810, and the state space representation 820. The video output 808 and the audio output 810 are encoded in the video encoder and streamer 812 and the audio encoder and streamer 814 respectively. The interaction recorder 822 records the encoded video, the encoded audio, the metadata 824 and the state space representation 820 then outputs the bundle of streams 826. The bundle of streams 826 is stored in the state space representation store 828. The function of the other parts as has been described above.

Figure 9:
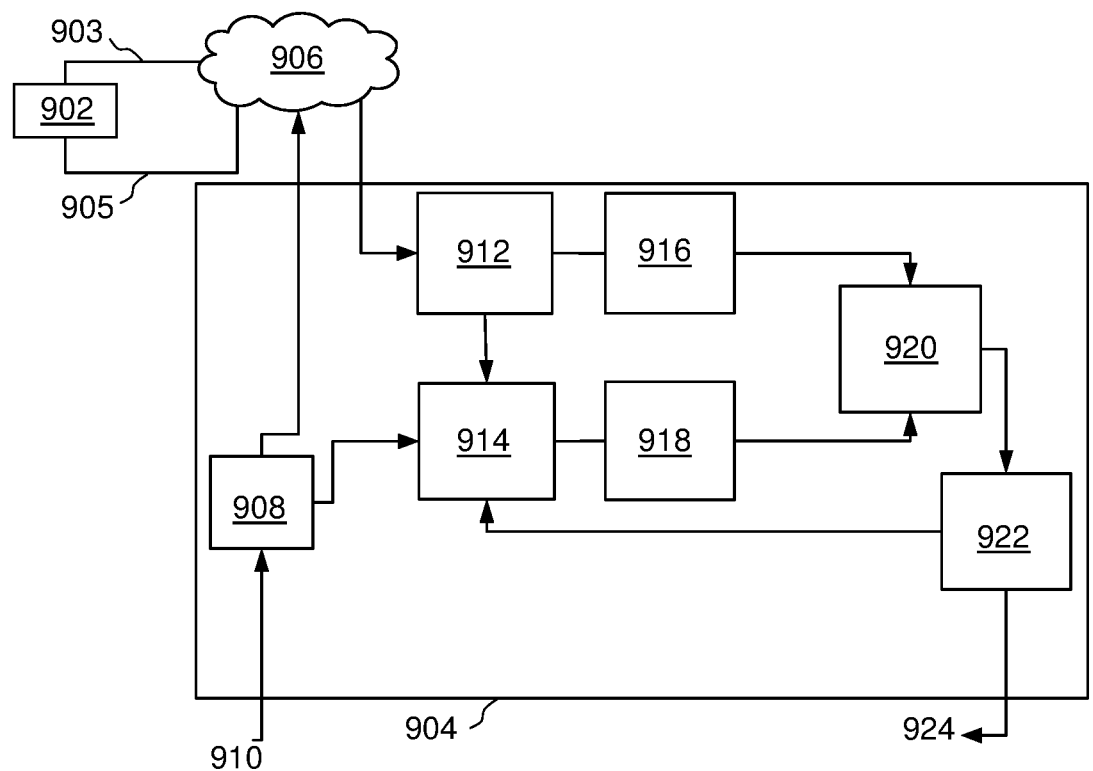
FIG. 9 is a schematic illustration of a second device that receives low-latency stream over an unreliable network in accordance with an embodiment of the present disclosure.

FIG. 9 is a schematic illustration of a second device that receives low-latency stream over an unreliable network in accordance with an embodiment of the present disclosure. The second device 904 receives low-latency stream over an unreliable network 906 from a first device 902, an output stream 903, a first input 905, the internet or the unreliable network 906, a input block 908, a second input 910, a stream 912 from the unreliable network 906, at least one predictive machine learning model 914, an application stream 916, a generate stream 918, a decision engine 920, an output stream 922, and an output 924. The first device 902 inputs the output stream 903 and the first input 905 to the internet or the unreliable network 906. The internet or the unreliable network 906 obtains input from the input block 908. The input from the input block 908 is obtained from the second input 910. The internet or the unreliable network 906 outputs an application stream and the regenerated lost frame of the time series data to the stream 912 from the unreliable network 906 and the at least one predictive machine learning model 914. The application stream comprises at least one frame of the time series data. The output stream 922 from the application stream and the regenerated lost frame of the time series data is compared using the decision engine 920.

Figure 10:
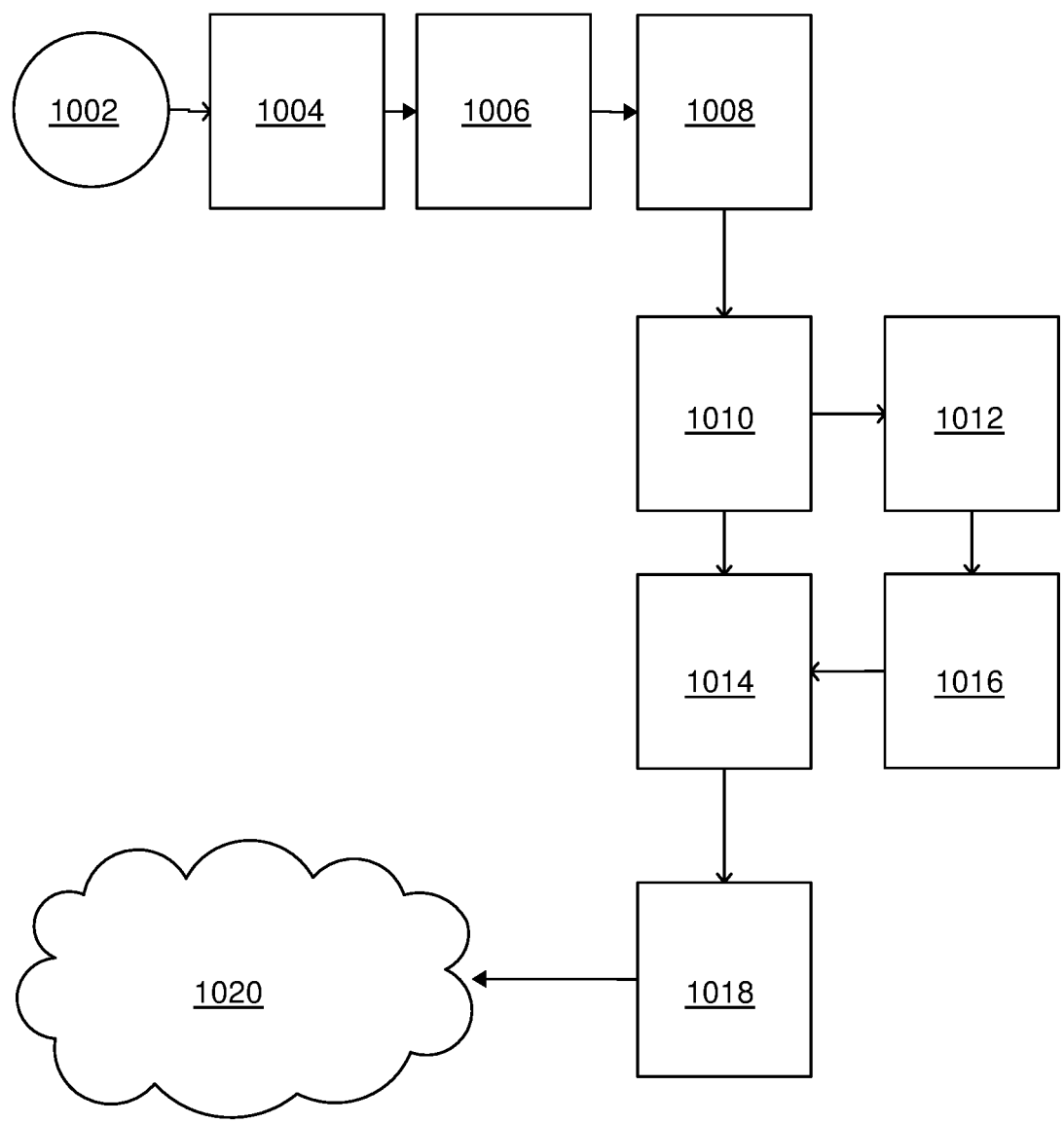
FIG. 10 is a schematic illustration of an architecture of a low-latency audio stream encoder system in accordance with an embodiment of the present disclosure.

FIG. 10 is a schematic illustration of an architecture of a low-latency audio stream encoder system in accordance with an embodiment of the present disclosure. The architecture of the low-latency audio stream encoder system comprises an audio 1002, a digitizer 1004, a framer 1006, an encoder 1008, a bitstream 1010, a dataloss model 1012, a packetizer 1014, an error encoder (FEC) 1016, a network transmitter 1018, and an internet or a network 1020. The audio 1002 is digitized in the digitizer 1004. The audio 1002 is encoded using the error encoder (FEC) 1016 and transmitted to the internet or the network 1020 through the network transmitter 1018. The function of these parts as has been known in the art.

Figure 11:
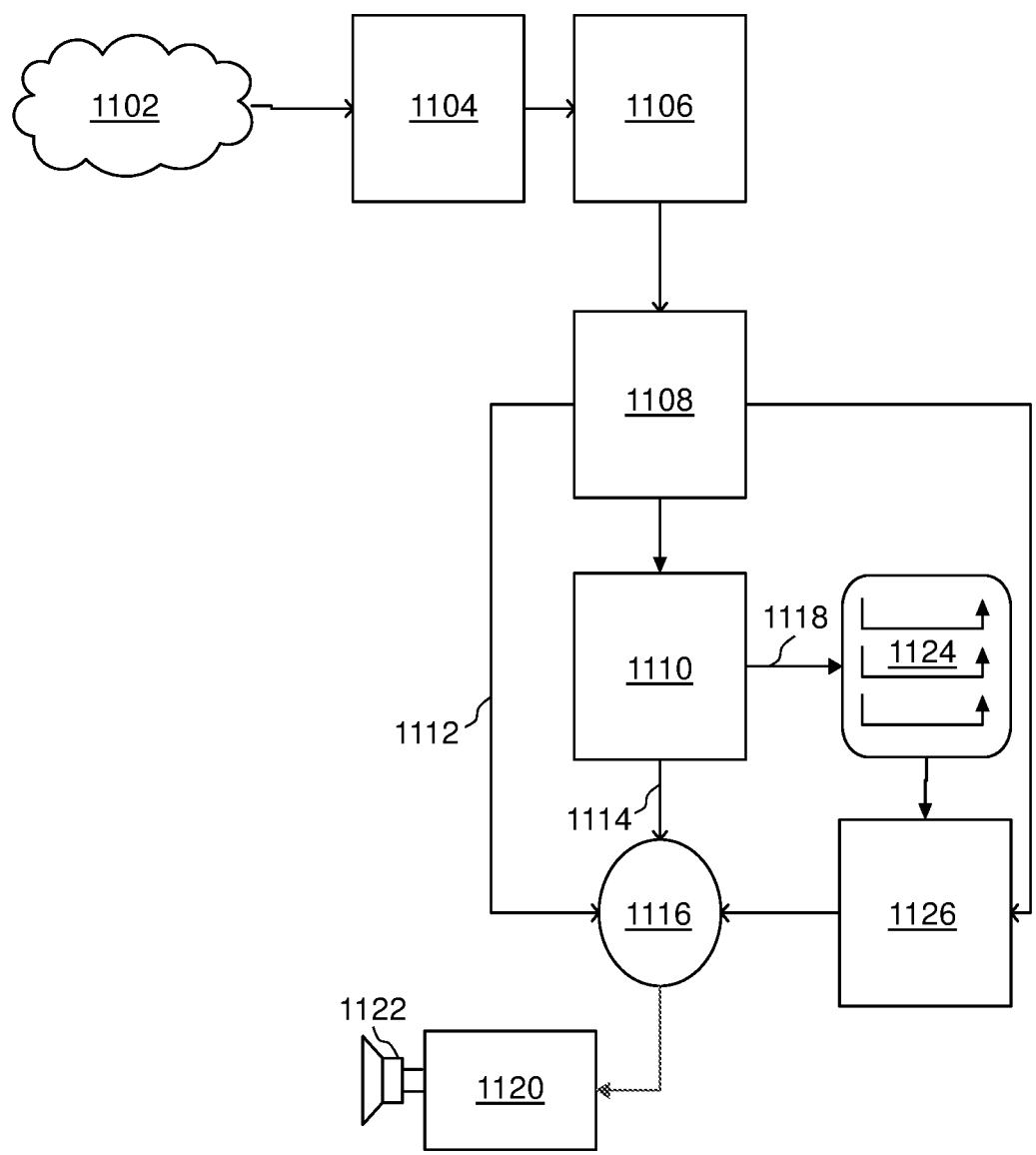
FIG. 11 is a schematic illustration of an architecture of a low-latency audio stream decoder system in accordance with an embodiment of the present disclosure.

FIG. 11 is a schematic illustration of an architecture of a low-latency audio stream decoder system in accordance with an embodiment of the present disclosure. The architecture of the low-latency audio stream decoder system using an audio stream decoder system comprises an internet or a network 1102, a network receiver 1104, a packet jitter buffer 1106, a depacketizer 1108, a decoder and a framer 1110, a packet loss indicator 1112, an audio frame 1114, a valid frame selector 1116, a decoded frames 1118, a playout audio frame 1120, a speaker 1122, a frame cache 1124, and an acoustic model 1126. The network receiver 1104 receives a state space representation from the internet or the unreliable network 1102. The acoustic model 1126 may be calibrated with the decoder and the framer 1110 and the acoustic model 1126 is static. The acoustic model 1126 may enable the decoder and the framer 1110 to regenerate at least one frame of time series data from a lost data. The function of these parts as has been known in the art.

Figure 12:
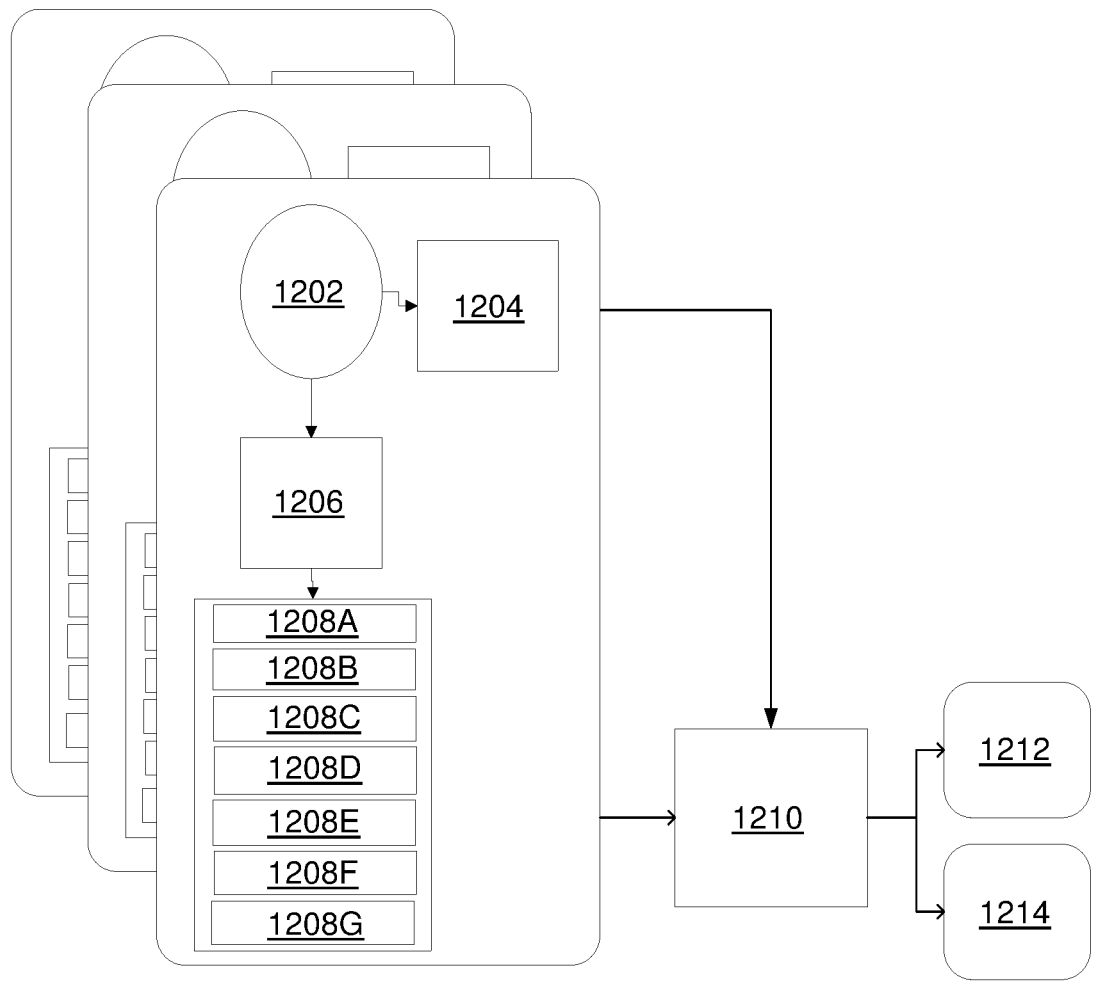
FIG. 12 is a schematic illustration of a predictive machine learning model training system in accordance with an embodiment of the present disclosure.

FIG. 12 is a schematic illustration of a predictive machine learning model training system in accordance with an embodiment of the present disclosure. The predictive machine learning model training system comprises an audio file 1202, a file metadata 1204, read audio frames 1206, a plurality of frames 1208A-1208G, a neural network model trainer 1210, a classifier model 1212, and a generator model 1214. The audio file 1202 is inputted to the file metadata 1204, and the read audio frames 1206. The read audio frames 1206 divides the audio file 1202 into the plurality of frames 1208A-1208G. The generator model 1214 is then trained using the neural network model trainer 1210 and the generator model 1214 generates an updated predictive machine learning model to regenerate at least one frame of time series data.

Figure 13:
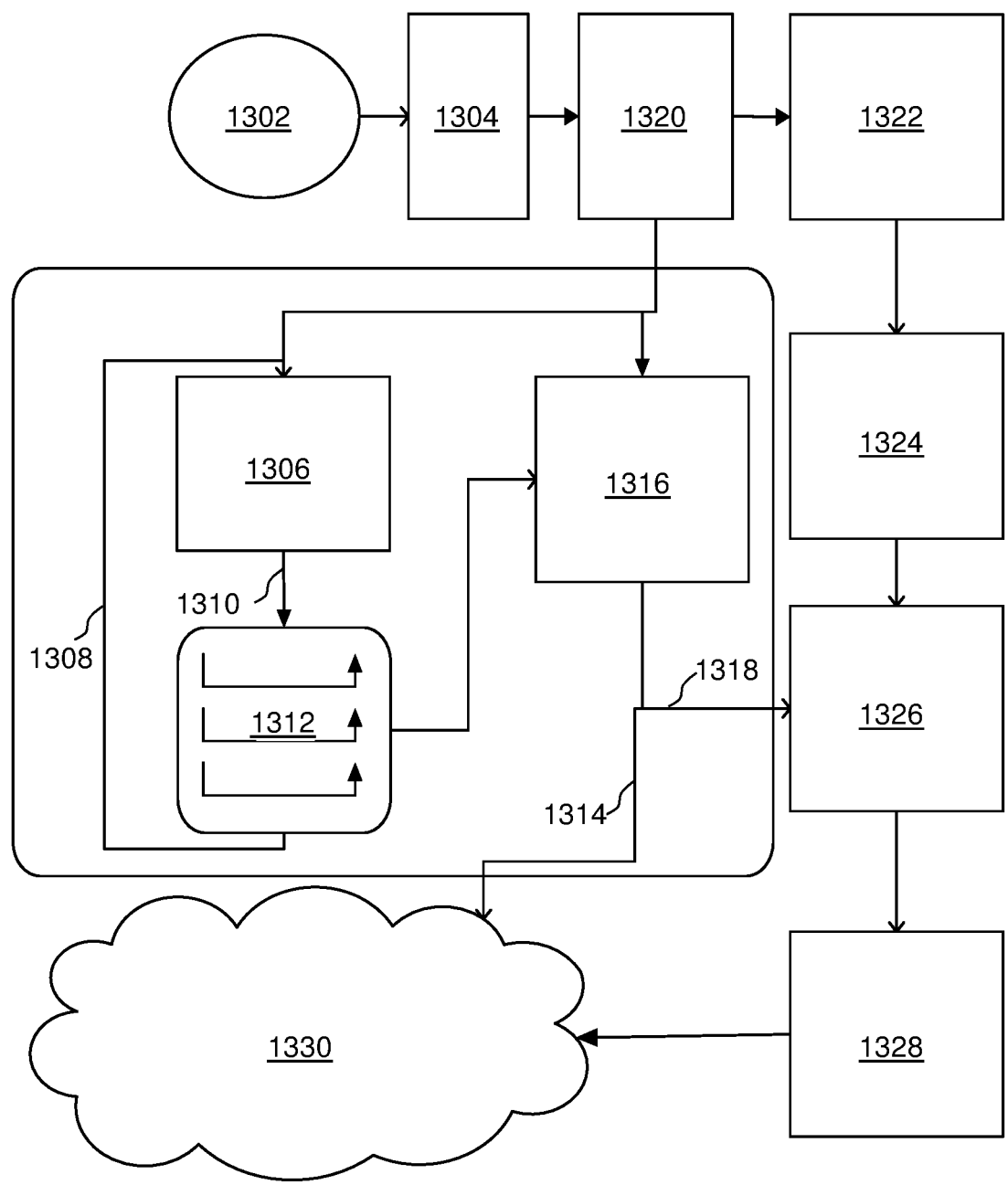
FIG. 13 is a schematic illustration of an encoder with a classifier model in accordance with an embodiment of the present disclosure.

FIG. 13 is a schematic illustration of an encoder with a classifier model in accordance with an embodiment of the present disclosure. The encoder comprises an audio 1302, a digitizer 1304, a frame generator model training engine 1306, read and updates 1308, a push updated model 1310, a model store 1312, an out-band model 1314, a frame generator selector 1316, an in-band model 1318, a framer 1320, an encoder 1322, a bitstream 1324, a packetizer 1326, a network transmitter 1328, and an internet or a network 1330. Previously received frame of time series data are digitized and framed by the digitizer 1304 and the framer 1320. The model store 1312 comprises at least one predictive machine learning model. The frame generator model training engine 1306 trains the at least one predictive machine learning model based on the previously received frame of time series data. The frame generator selector 1316 selects a suitable predictive machine learning model for regenerating at least one lost frame of the time series data based on at least one output stream. The function of other parts as has been known in the art.

Figure 14:
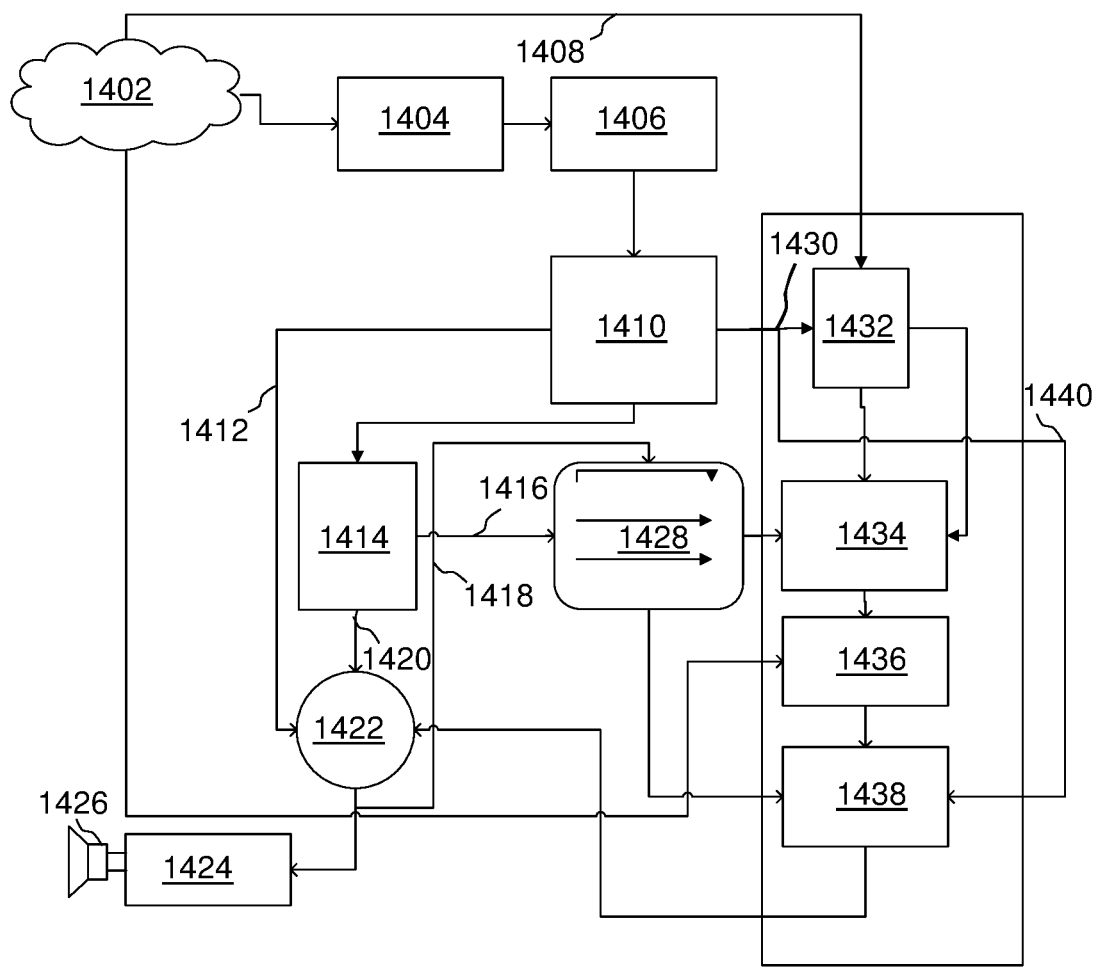
FIG. 14 is a schematic illustration of a decoder with a frame generator in model training engine accordance with an embodiment of the present disclosure.

FIG. 14 is a schematic illustration of a decoder with a frame generator model training engine in accordance with an embodiment of the present disclosure. The frame generator model training engine includes an internet or a network 1402, a network receiver 1404, a packet jitter buffer 1406, an out of band model bundle ID 1408, a depacketizer 1410, a packet loss indicator 1412, a decoder and framer 1414, a decoded frame 1416, an insert generated frame 1418, an audio frame 1420, a valid frame selector 1422, a playout audio frame 1424, a speaker 1426, a frame cache 1428, an in-band model ID 1430, a frame model ID 1432, a frame generator and model selector 1434, a frame generator model cache or library 1436, a frame generator model 1438, and a packet loss indicator 1440. A set of predictive models that are generated may be used at a second device for determining a minimal set of predictive models used to generate fill frames for a stream by (i) finding a predictive model that produce a lost frame of time series data with high confidence, (ii) using the minimum amount of computation resource, and (iii) completing the frame generation within a stipulated/allotted time. The function of other parts as has been known in the art.

Figure 15:
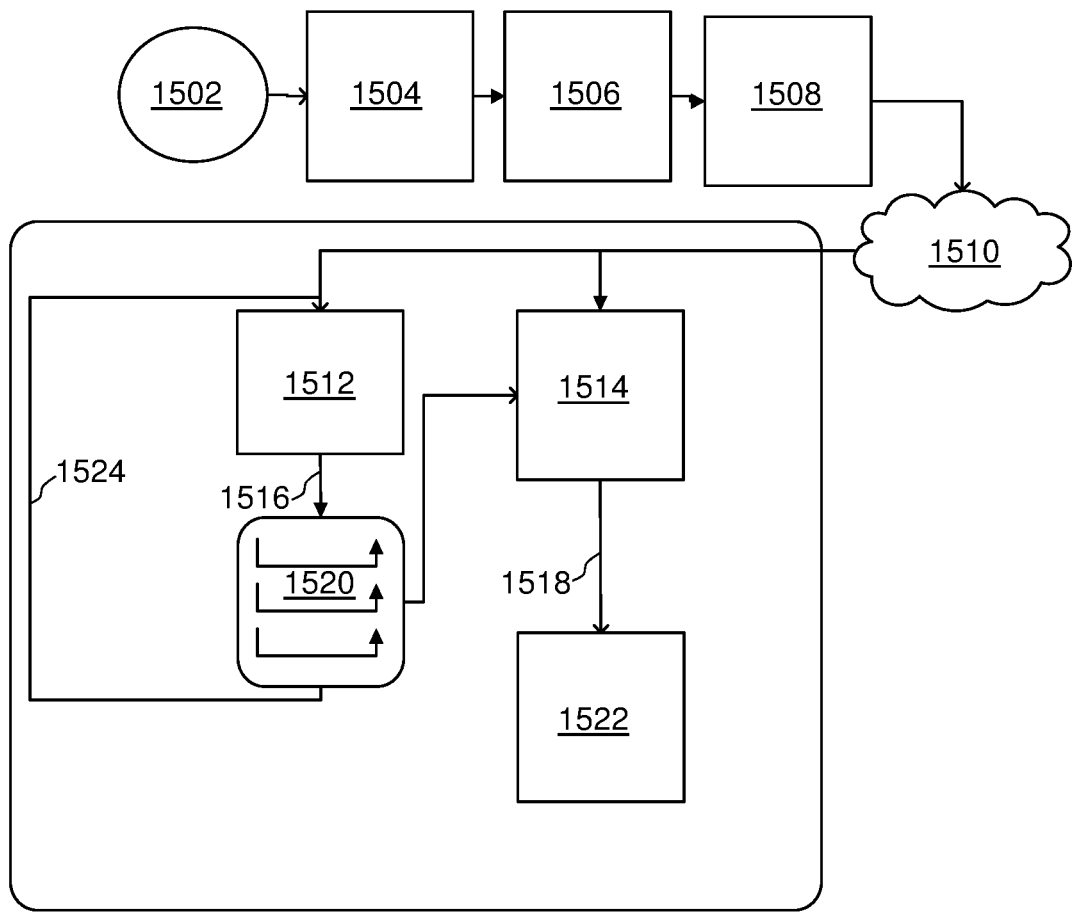
FIG. 15 is a schematic illustration of a model selector and bundling system of a second device or a first device in accordance with an embodiment of the present disclosure.

FIG. 15 is a schematic illustration of a model selector and bundling system of a second device or a first device in accordance with an embodiment of the present disclosure. The model selector and bundling system of the second device or the first device includes an audio 1502, a digitizer 1504, a framer 1506, a bar length down sample 1508, an internet or a network 1510, a frame generator model training engine 1512, a frame generator and a model selector 1514 that is ranked by probability fit, a push updated model 1516, an in-band model selector information 1518, a model library

1520, a model bundle store (such as voice ID, best fit models) 1522, and a read and update 1524. When a lost frame of time series data is generated with a low-confidence score, the second device may consider the broadest set of predictive machine learning models for predictive frame regeneration. The function of other parts as has been known in the art.

Figure 16:
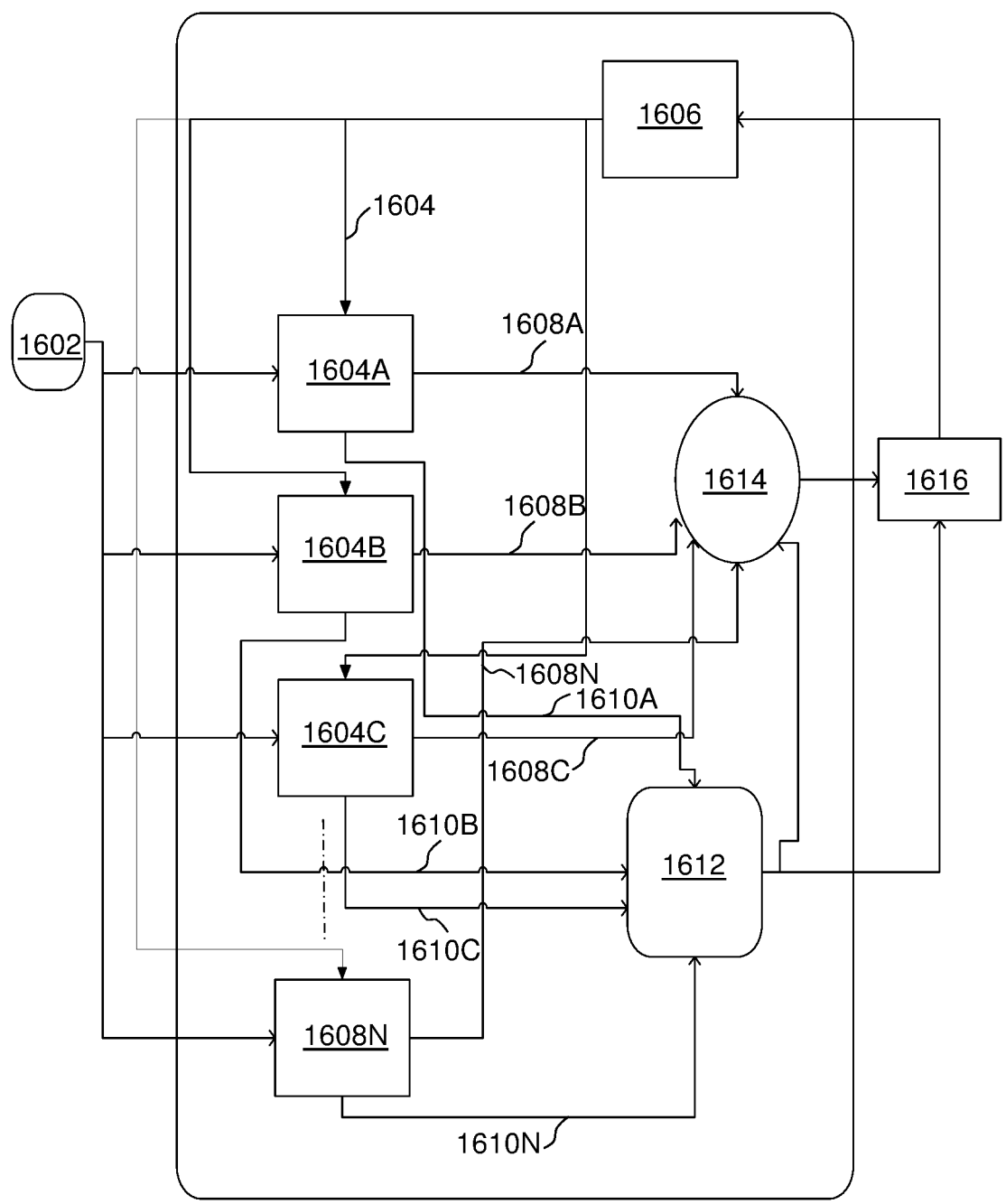
FIG. 16 is a schematic illustration of an adaptive model selection system in accordance with an embodiment of the present disclosure.

FIG. 16 is a schematic illustration of an adaptive model selection system in accordance with an embodiment of the present disclosure. The adaptive model selection system includes a frame cache 1602, a model enabler 1604, a plurality of audio frame generator models 1604A-1604N, an adaptive generator pruning 1606, a generated audio 1608A-1608N, a score 1610A-1610N, a voter 1612, a model selector 1614, and an audio frame 1616. A second device may communicatively connect with a first device to determine a better bundle model for a frame of time series data. The second device pushes a decoded frame of time series data to the first device. The first device may comprise the adaptive model selection system that uses the frame of time series data to (i) classify an audio, (ii) select a best set of predictive model package based on the second device computation capability to obtain bundle models and (iii) send the bundle models to the second device. The second device may use a new bundle model to generate fill frames for that frame of time series data. The function of other parts as has been known in the art.

Figure 17:
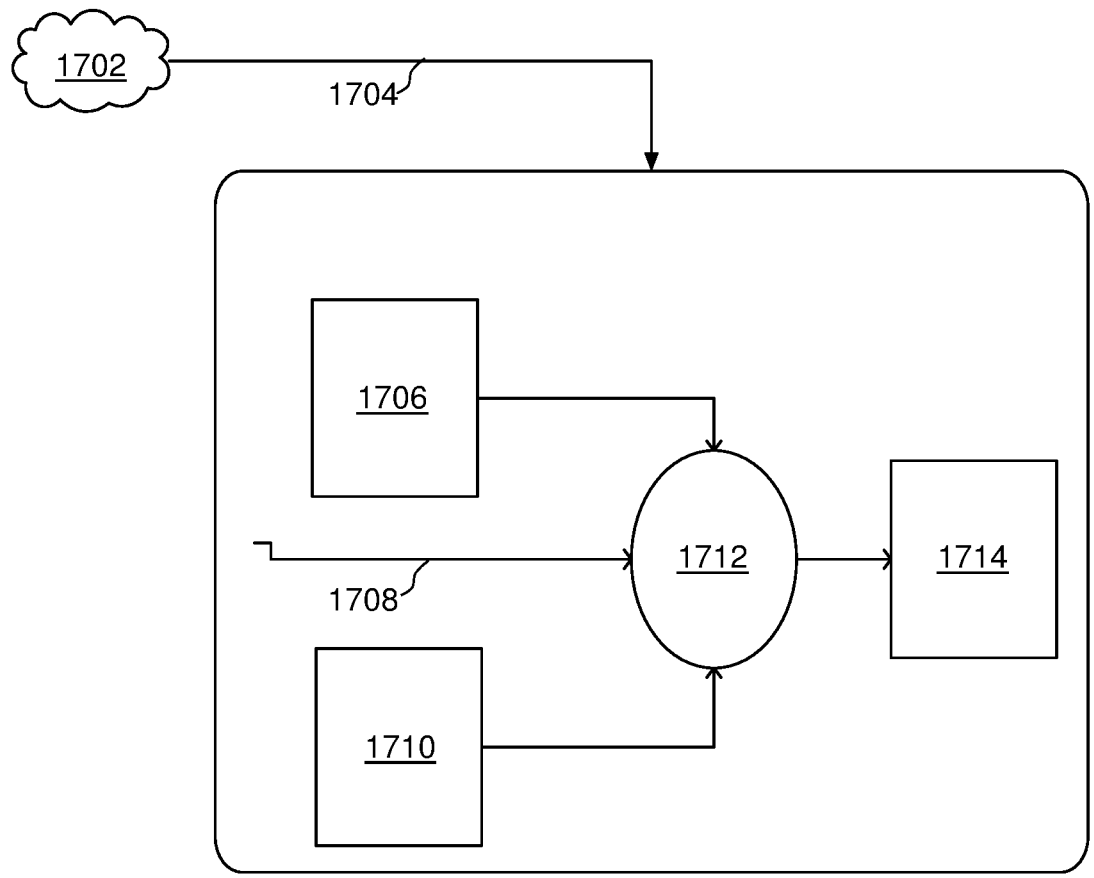
FIG. 17 is a schematic illustration of a frame generator with a decoder in accordance with an embodiment of the present disclosure.

FIG. 17 is a schematic illustration of a frame generator with a decoder in accordance with an embodiment of the present disclosure. The frame generator with the decoder includes an internet or a network 1702, a network packets 1704, a decoded frame 1706, a packet loss indicator 1708, a generated frame 1710, a model selector 1712, and a playout queue 1714. A second device may comprise the decoder that pushes a decoded frame of time series data to a first device (e.g. a cloud server). The first device uses the frame of time series data to (i) classify an audio, (ii) select a best set of predictive model package based on the second device computation capability to obtain bundle models and (iii) send the bundle models to the second device. The function of other parts as has been known in the art.

Figure 18:
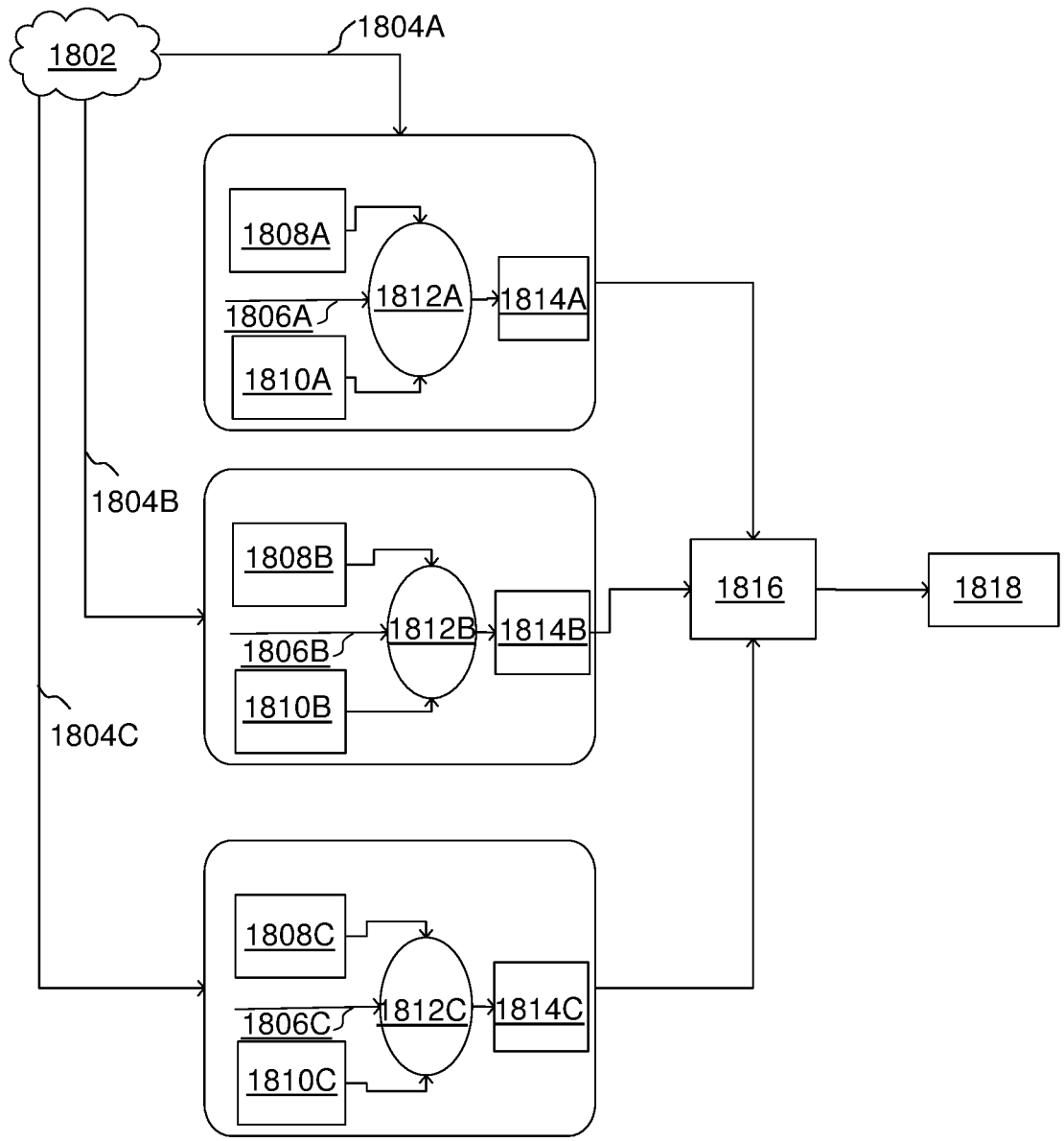
FIG. 18 is a schematic illustration of a frame classifier with a model generator for an audio stream in accordance with an embodiment of the present disclosure.

FIG. 18 is a schematic illustration of a frame classifier with a model generator for an audio stream in accordance with an embodiment of the present disclosure. The frame classifier with the model generator includes an internet or a network 1802, one or more peer packet stream 1804A-1804C, one or more packet loss indicator 1806A-1806C, one or more decoded frame 1808A-1808C, one or more generated frame 1810A-1810C, one or more model selector 1812A-1812C, one or more playout queue 1814A-1814C, an audio mixer 1816, and a playout 1818. The frame classifier and the model generator may provide continuous improvement in audio quality as at least one predictive machine learning model of a first device is periodically re-trained and a second device may receive those improved predictive machine learning models on each model update pull requests. The function of other parts as has been known in the art.

Figure 19:
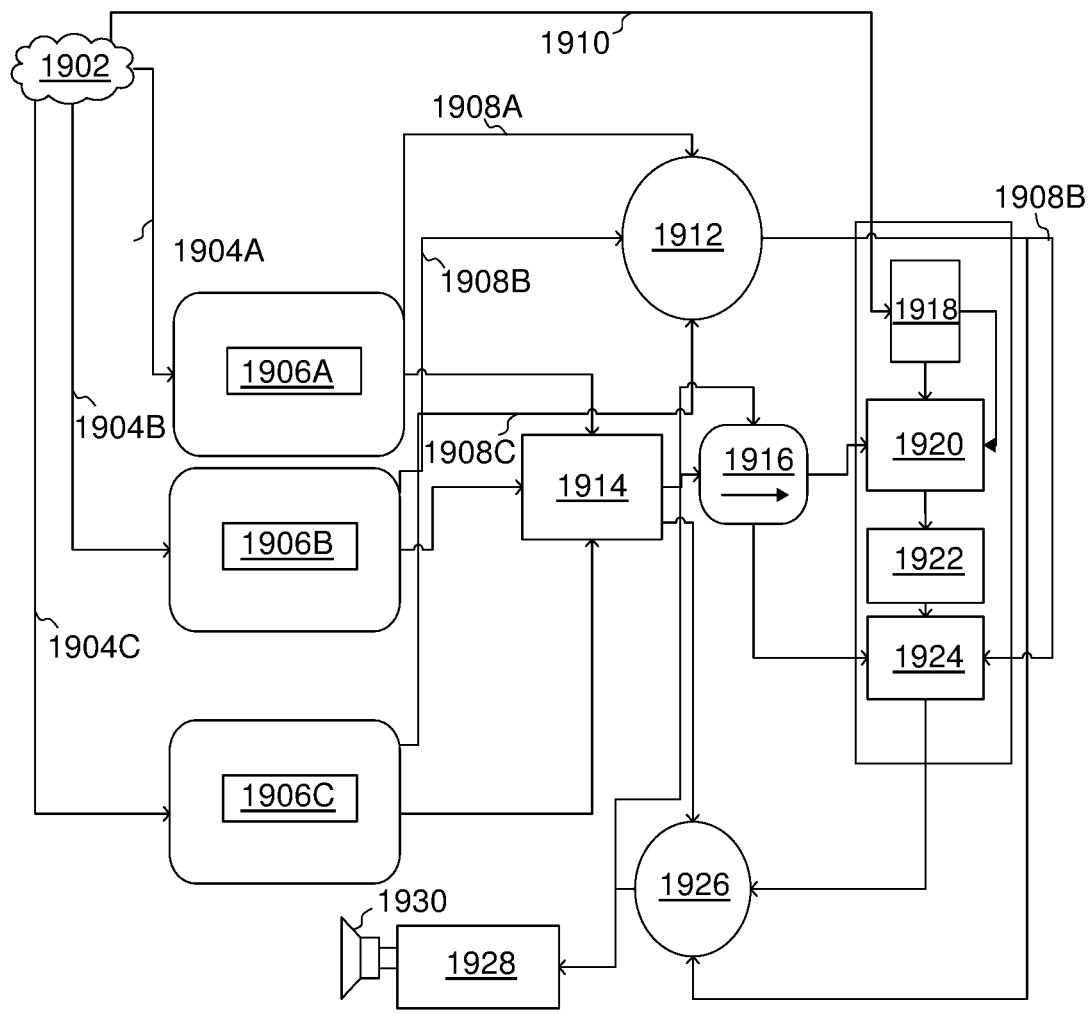
FIG. 19 is a schematic illustration of a model regenerator with multiple streams in accordance with an embodiment of the present disclosure.

FIG. 19 is a schematic illustration of a model regenerator with multiple streams in accordance with an embodiment of the present disclosure. The model regenerator includes an internet or a network 1902, one or more peer packet stream 1904A-1904C, one or more audio decoder 1906A-1906C, one or more packet loss indicator 1908A-1908C, an out of band cloud frame generator 1910, a packet loss indicator merger 1912, an audio mixer 1914, a frame cache 1916, a stream classifier and a model identifier 1918, a frame generator and a model selector 1920, a frame generator model cache or library 1922, a frame generator model 1924, a valid frame selector 1926, a playout frame 1928, and a speaker 1930. The model regenerator may regenerate a lost frame of time series data using one or more peer packet stream 1904A-1904C. The function of other parts as has been known in the art.

Figure 20:
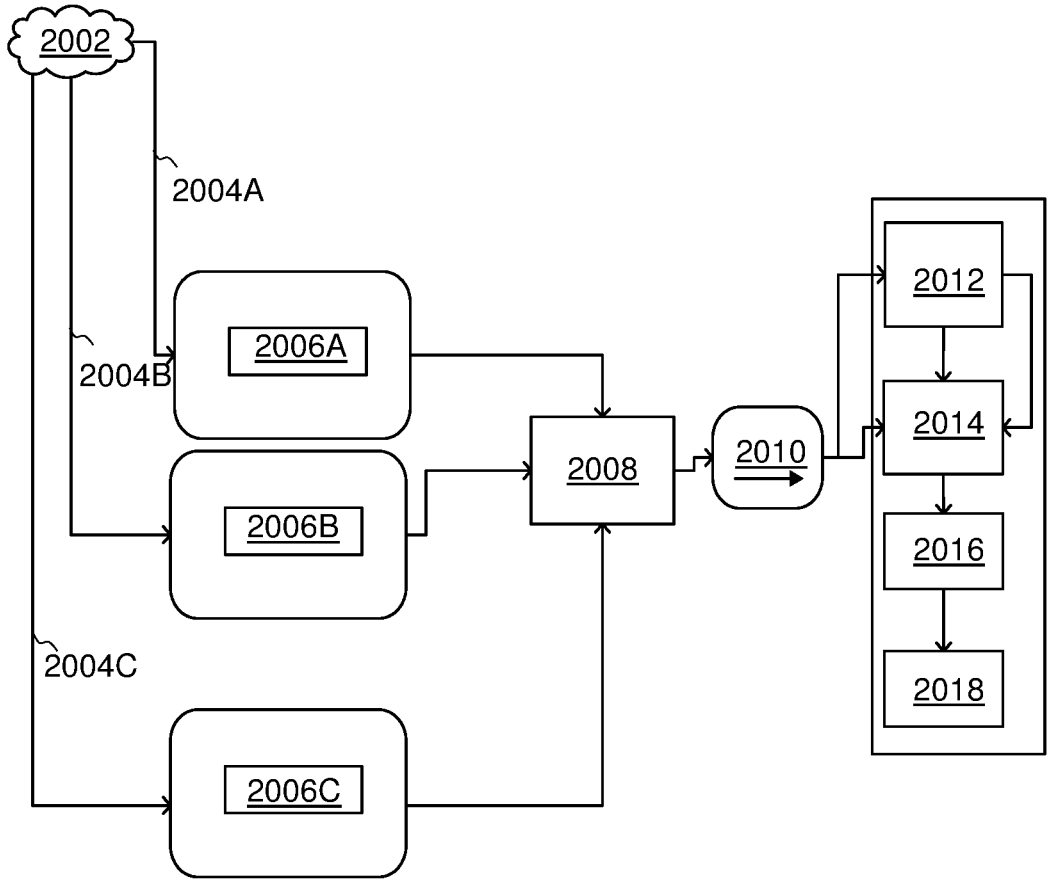
FIG. 20 is a schematic illustration of a cloud mixer and a model selector in accordance with an embodiment of the present disclosure.

FIG. 20 is a schematic illustration of a cloud mixer and a model selector in accordance with an embodiment of the present disclosure. The cloud mixer and the model selector include an internet or a network 2002, one or more peer packet stream 2004A-2004C, one or more audio decoder 2006A-2006C, an audio mixer 2008, a frame cache 2010, a stream classifier and a model identifier 2012, a frame generator and a model selector 2014, a frame trainer and update model cache or library 2016, and a generated stream 2018 with bundle information. The cloud mixer and the model selector may select a suitable predictive machine learning model to regenerate lost frame of time series data. The function of other parts as has been known in the art.

Figure 21:
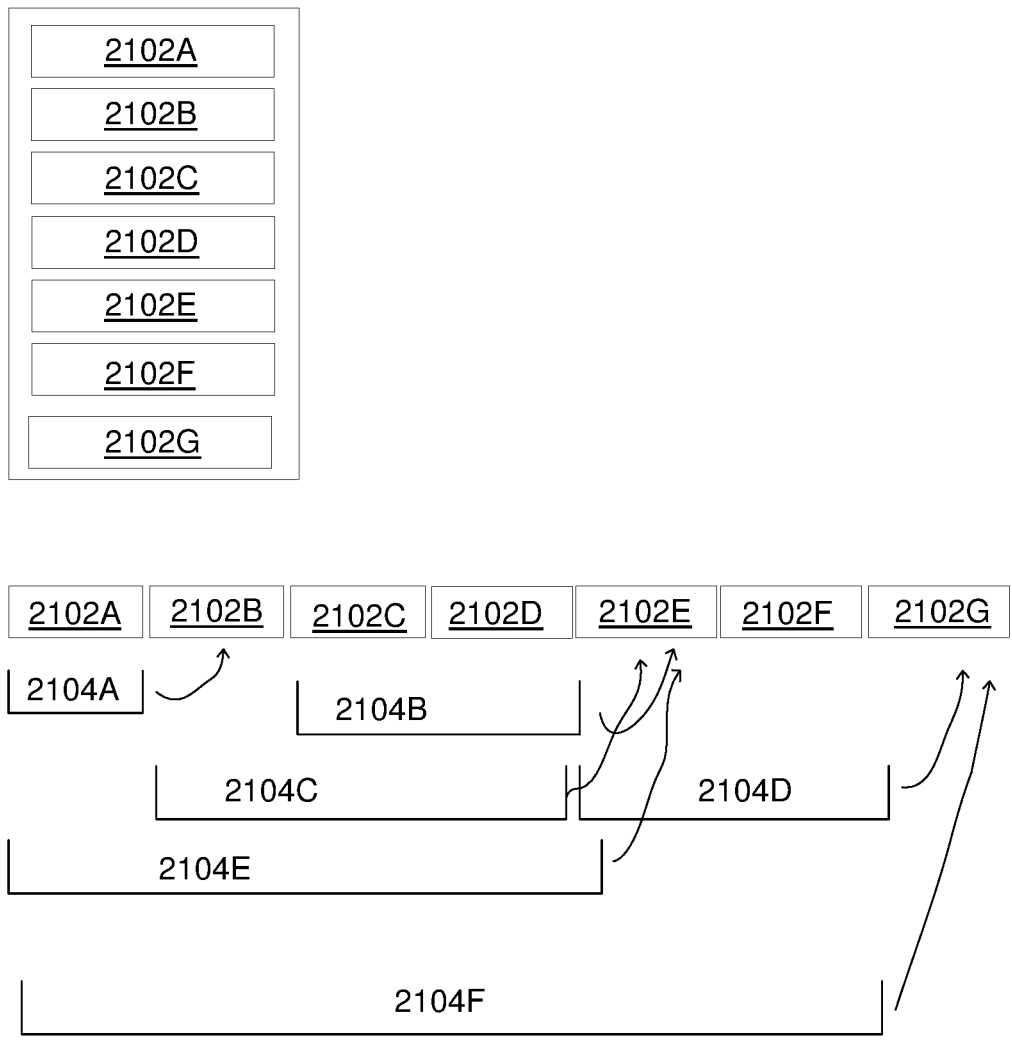
FIG. 21 is a schematic illustration of a bit stream from frames of time series data in accordance with an embodiment of the present disclosure.

FIG. 21 is a schematic illustration of a bit stream from frames of time series data in accordance with an embodiment of the present disclosure.

The schematic illustration illustrates the various dynamic size of the bitstream used for predictive frame generation. The schematic illustration illustrates a different size input vector that is used by at least one predictive machine learning model. The frames 2102A-2102G are bit streamed using bitstreams 2104A-2104F.

Figure 22:
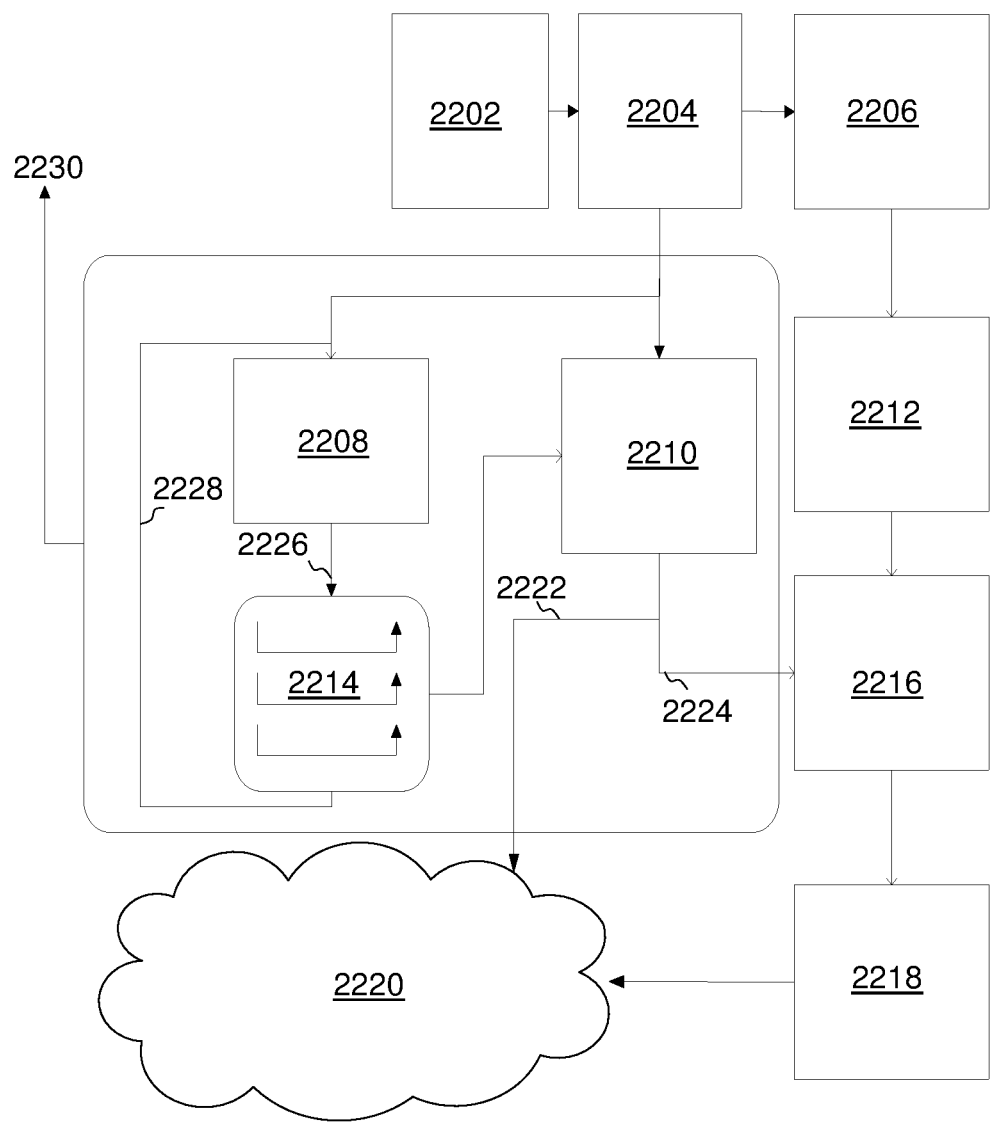
FIG. 22 is a schematic illustration of an encoder with a frame classifier in accordance with an embodiment of the present disclosure.

FIG. 22 is a schematic illustration of an encoder with a frame classifier in accordance with an embodiment of the present disclosure. The encoder with the frame classifier comprises an input data 2202, a framer 2204, an encoder 2206, a frame generator model training engine 2208, a frame generator and model selector 2210, a bit streamer 2212, a model store 2214, a packetizer 2216, a network transmitter 2218, an internet or a network 2220, an out-band model 2222, in-band model selector 2224, a push updated model 2226, read and update model 2228 and an online/dynamic frame generator model training system 2230. The framer 2204 and the encoder 2206 frames and encodes a previously received frame of time series data. The model store 2214 comprises at least one predictive machine learning model. The frame generator model training engine 2208 is trained based on the previously received frame of the time series data. The frame generator and model selector 2210 may select a suitable predictive machine learning model for regenerating a lost frame of the time series data from a state space representation associated with frames of the time series data. The function of other parts as has been known in the art.

Figure 23:
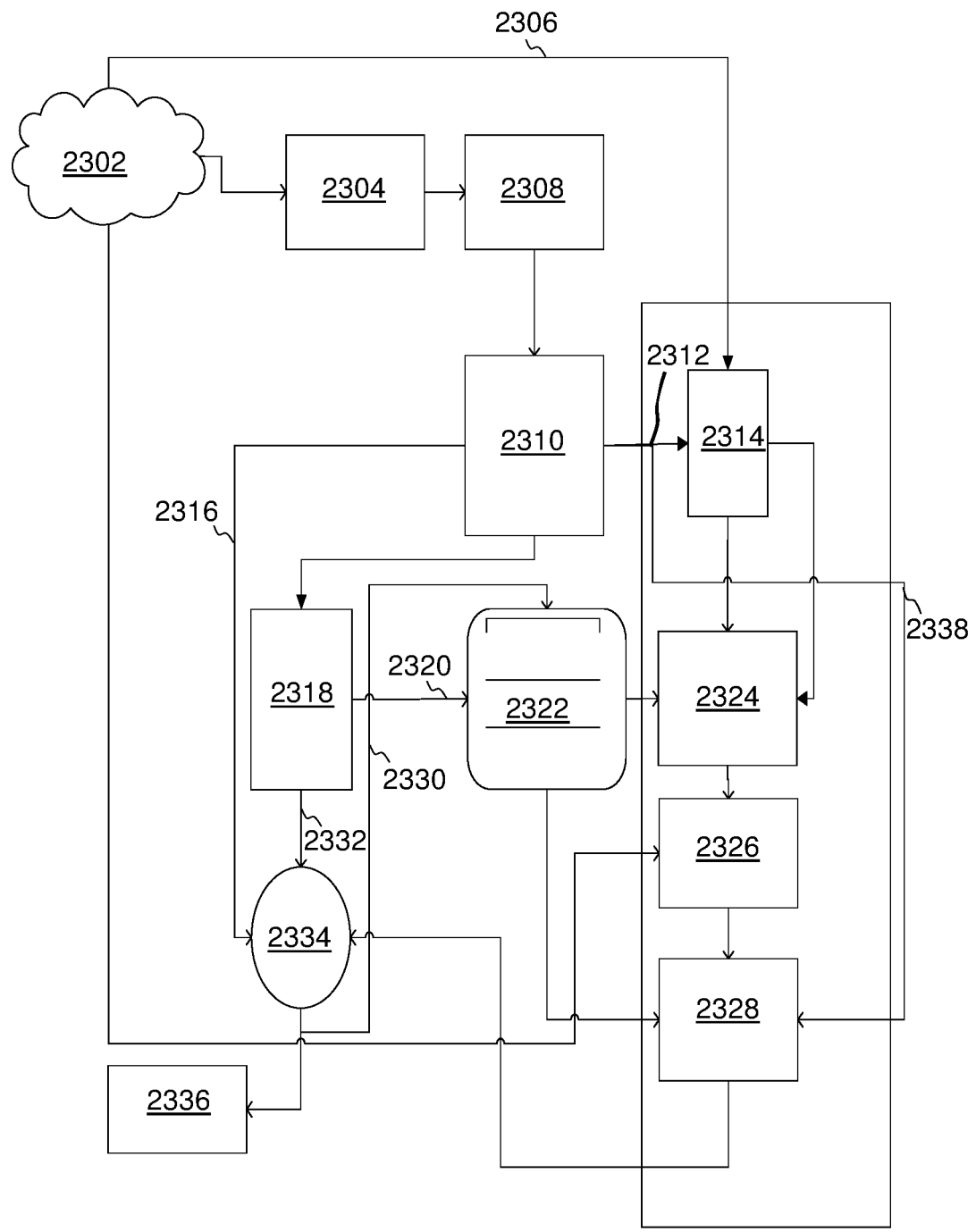
FIG. 23 is a schematic illustration of a decoder with a frame generator in accordance with an embodiment of the present disclosure.

FIG. 23 is a schematic illustration of a decoder with a frame generator in accordance with an embodiment of the present disclosure. The decoder with the frame generator includes an internet or a network 2302, a network receiver 2304, an out of band model bundle ID 2306, a packet jitter buffer 2308, a depacketizer 2310, an in-band information 2312, a frame model ID 2314, a packet loss indicator 2316, a decoder and framer 2318, a decoded frame 2320, a frame cache 2322, a frame generator and model selector 2324, a frame generator and model cache or library 2326, a frame generator model 2328, an insert generated frame 2330, an audio frame 2332, a valid frame selector 2334, and an output stream 2336. A set of predictive models that are generated may be used at a second device for determining a minimal set of predictive models used to generate fill frames for a stream by (i) finding a predictive model that produce a lost frame of time series data with high confidence, (ii) using the minimum amount of computation resource, and (iii) completing the frame generation within a stipulated/allotted time. The function of other parts as has been known in the art.

Figure 24A:
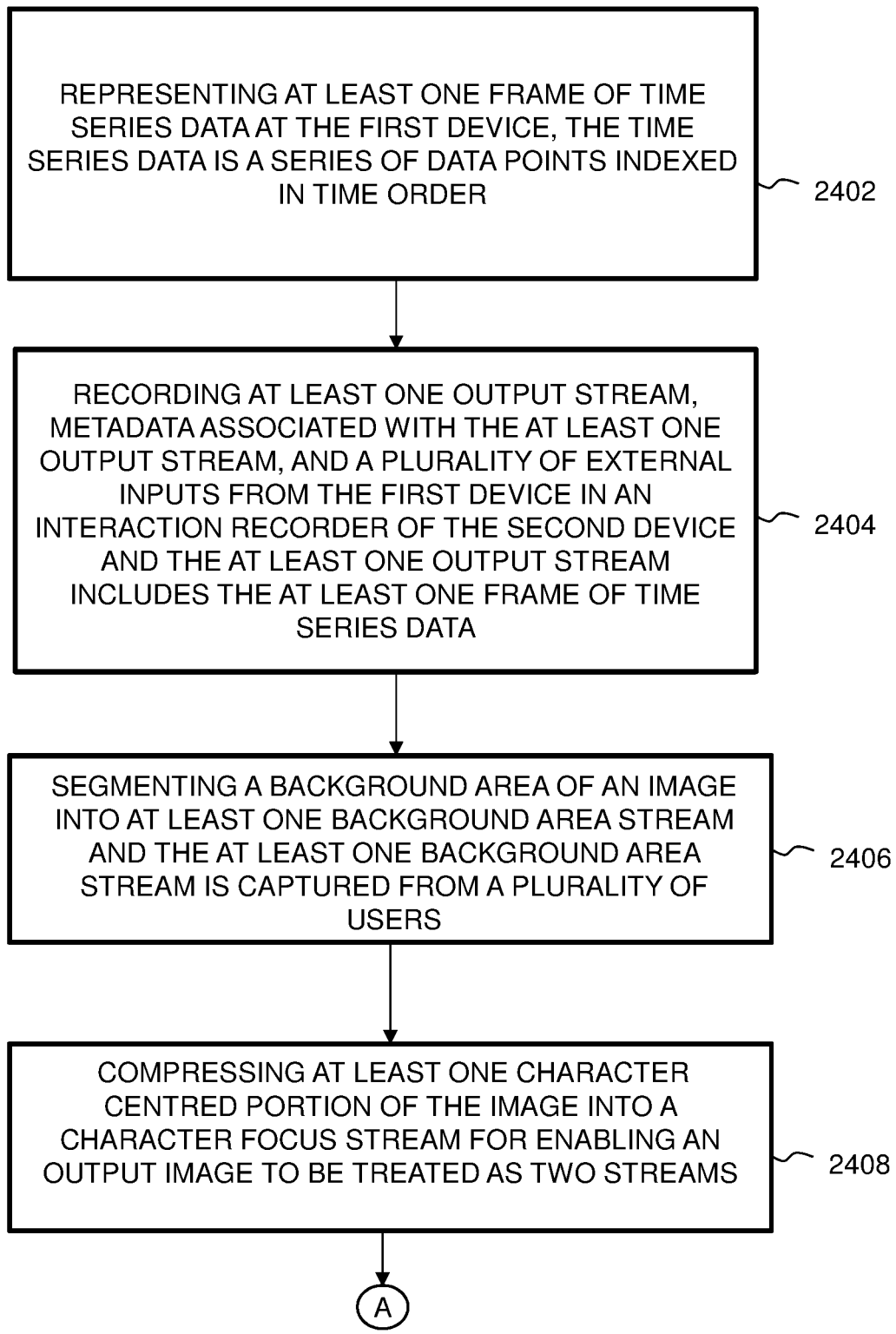
FIGS. 24A-24C are flow diagrams illustrating a method for low-latency communication from a first device to a second device over unreliable networks using at least one predictive machine learning model according to an embodiment of the present disclosure.
Figure 24B:
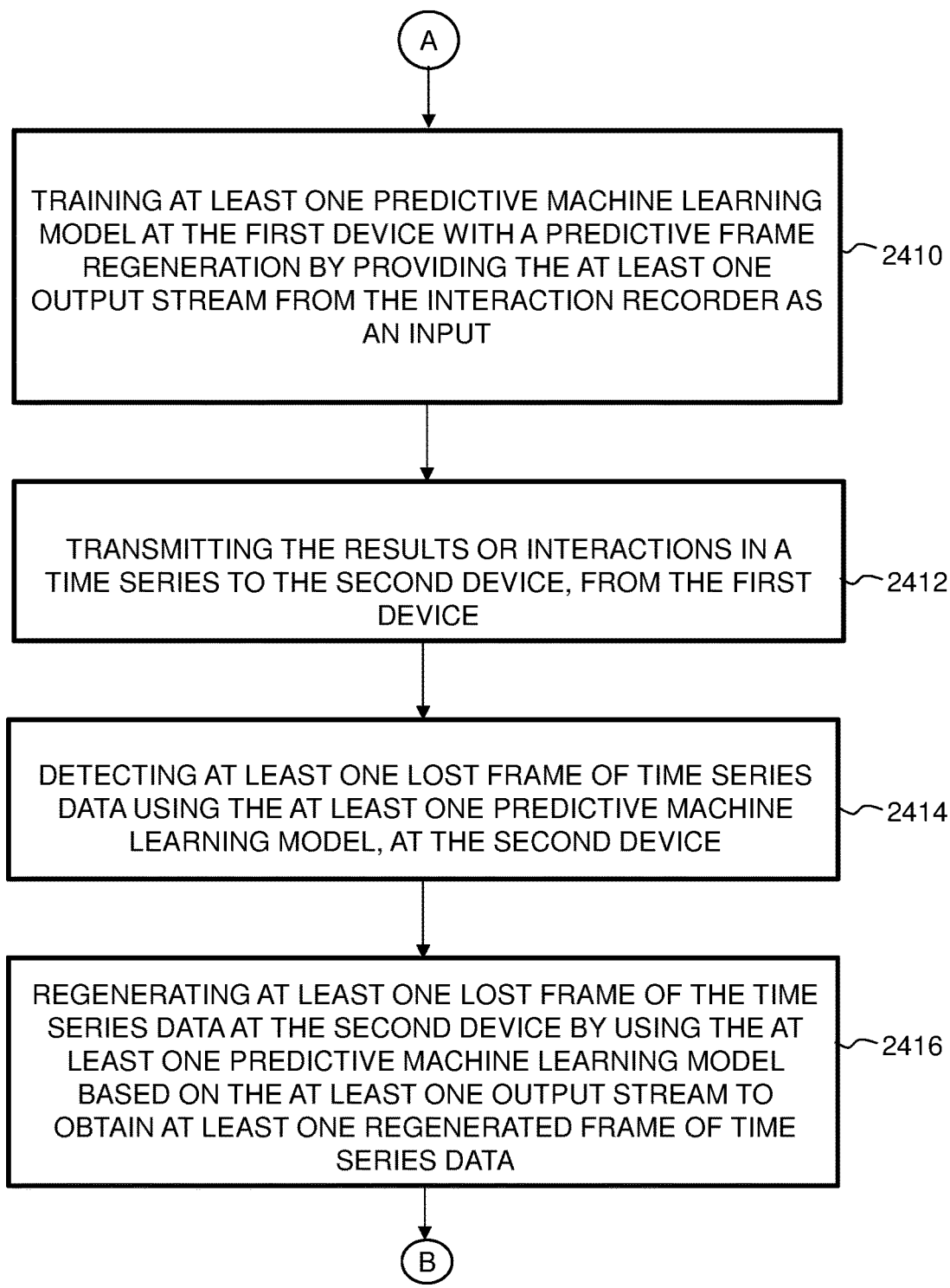
Figure 24C:
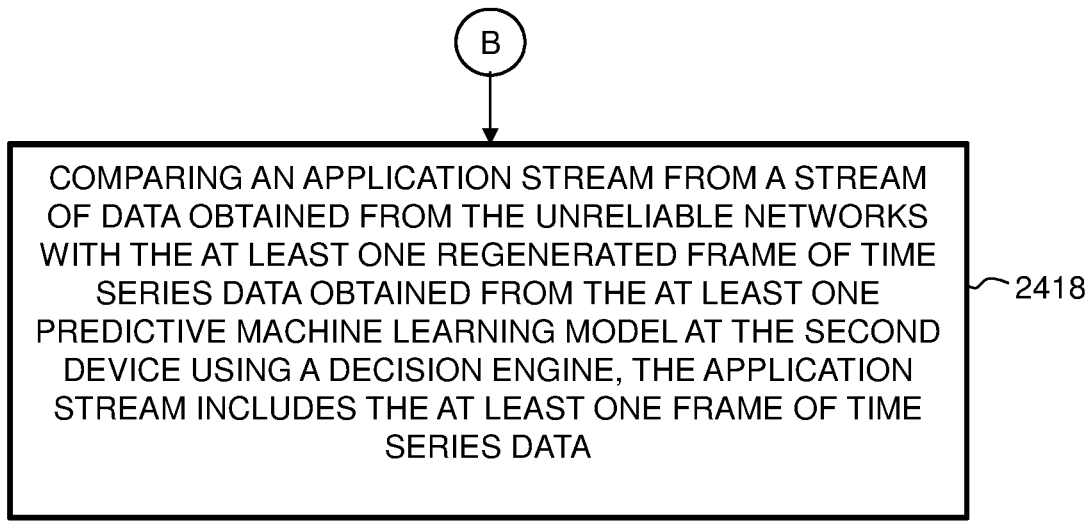

FIGS. 24A-24C are flow diagrams illustrating a method for low-latency communication from a first device to a second device over unreliable networks using at least one predictive machine learning model according to an embodiment of the present disclosure. At a step 2402, at least one frame of time series data is represented at the first device. The time series data is a series of data points indexed in time order. At a step 2404, at least one output stream, a metadata associated with the at least one output stream, and a plurality of external inputs from the first device is recorded in an interaction recorder of the second device. The at least one output stream comprises the at least one frame of time series data. At a step 2406, a background area of an image is segmented into at least one background area stream and the at least one background area stream is captured from a plurality of users. At a step 2408, at least one character centered portion of the image is compressed into a character focus stream for enabling an output image to be treated as two streams. At a step 2410, the at least one predictive machine learning model at the first device is trained with a predictive frame regeneration by providing the at least one output stream from the interaction recorder as input. At a step 2412, the results or interactions are transmitted in a time series to the second device from the first device. At a step 2414, at least one lost frame of time series data is detected using the at least one predictive machine learning model, at the second device. At a step 2416, the at least one lost frame of the time series data is regenerated at the second device using the at least one predictive machine learning model based on the at least one output stream to obtain at least one regenerated frame of time series data. At a step 2418, an application stream from a stream of data obtained from the unreliable networks is compared with the at least one regenerated frame of time series data obtained from the at least one predictive machine learning model at the second device using a decision engine. The application stream comprising at least one frame of time series data.

Figure 25:
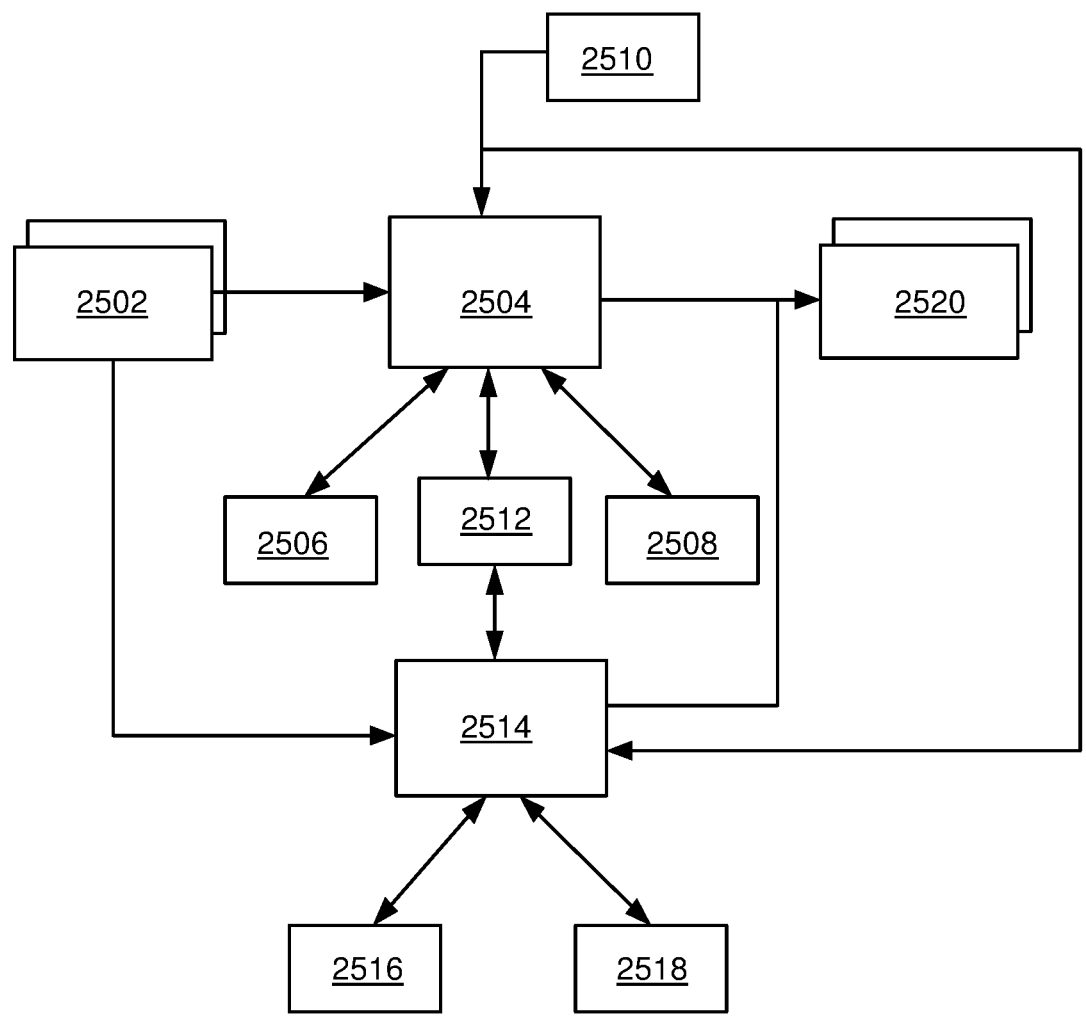
FIG. 25 is an illustration of an exploded view of a distributed computing system or cloud computing implementation in accordance with an embodiment of the present disclosure.

FIG. 25 is an illustration of an exploded view of a distributed computing system or cloud computing implementation in accordance with an embodiment of the present disclosure. The exploded view comprises an input interface 2502, a control module that comprises a processor 2504, a memory 2506 and a non-volatile storage 2508, processing instructions 2510, a shared/distributed storage 2512, a server that comprises a server processor 2514, a server memory 2516 and a server non-volatile storage 2518 and an output interface 2520. The function of the server processor 2514, the server memory 2516 and the server non-volatile storage 2518 are thus identical to the processor 2504, the memory 2506 and the non-volatile storage 2508 respectively. The functions of other parts are as has been known in the art.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for low-latency communication from a first device to a second device over an unreliable network using at least one predictive machine learning model, the method comprising:
   representing at least one frame of time series data at the first device, wherein the time series data is a series of data points indexed in time order;
   recording at least one output stream, a metadata associated with the at least one output stream, and a plurality of external inputs from the first device in an interaction recorder of the second device, wherein the at least one output stream comprises the at least one frame of time series data;
   segmenting an image into at least one background area stream and at least one character-centered portion, wherein the at least one background area stream is captured from a plurality of users;
   compressing the at least one character centered portion of the image into a character focus stream;
   detecting, at the second device, at least one lost frame of time series data using a frame of time series data from previously received frames;
   training the at least one predictive machine learning model at the first device for a predictive frame regeneration by providing the at least one output stream from the interaction recorder as an input;
   transmitting results of the training or interactions, between the first device and the second device, in a time series to the second device, from the first device;
   regenerating the at least one lost frame of time series data, at the second device using the at least one predictive machine learning model based on the at least one output stream to obtain at least one regenerated frame of time series data; and
   combining an output stream from an application stream with the at least one regenerated frame of time series data obtained from the at least one predictive machine learning model, at the second device to obtain a modified output stream, wherein the application stream comprises the at least one frame of time series data.

2. A method for low-latency communication from a first device to a second device over an unreliable network as claimed in claim 1, wherein the results or interactions in the time series comprises a state space representation or the modified output stream of the at least one frame of time series data, wherein the state space representation comprises interactions between the first device and the second device.

3. A method for low-latency communication from a first device to a second device over an unreliable network as claimed in claim 2, wherein the method comprises providing the state space representation and the interaction between the first device and the second device as an input for training the at least one predictive machine learning model and generating a plurality of predictive machine learning model based on the input.

4. A method for low-latency communication from a first device to a second device over an unreliable network as claimed in claim 1, wherein the training of the at least one predictive machine learning model comprises generating a plurality of predictive machine learning models based on a number of frames in a sequence and the second device computing capability.

5. A method for low-latency communication from a first device to a second device over an unreliable network as claimed in claim 4, the plurality of predictive machine learning models comprises a stream source classification model, wherein the stream source classification model is selected by identifying the at least one predictive machine learning model to be used when an input is not tagged as a particular type.

6. A method for low-latency communication from a first device to a second device over an unreliable network as claimed in claim 1, wherein the method comprises selecting a suitable predictive machine learning model for the predictive frame regeneration based on the second device's computing capability and a quality of the at least one regenerated frame of time series data.

7. A method for low-latency communication from a first device to a second device over an unreliable network as claimed in claim 1, wherein the predictive frame regeneration comprises the at least one background area stream and the character focus stream.

8. A method for low-latency communication from a first device to a second device over an unreliable network as claimed in claim 1, wherein the at least one lost frame of the time series data is detected using a frame loss indicator.

9. A method for low-latency communication from a first device to a second device over an unreliable network as claimed in claim 1, wherein the method comprises detecting a packet lost in the at least one frame of time series data by a packet sequence number or by using a mean or a median an inter-arrival time.

10. A method for low-latency communication from a first device to a second device over an unreliable network as claimed in claim 1, wherein the method comprises calibrating an acoustic model with a decoder, wherein the acoustic model enables the decoder to regenerate the at least one lost frame of the time series data from a lost data.

11. A method for low-latency communication from a first device to a second device over an unreliable network as claimed in claim 1, wherein the method comprises producing fill-frames using a different number of input frames as an input vector to the at least one predictive machine learning model to generate an output frame, wherein the output frame is of a different frame size.

12. A method for low-latency communication from a first device to a second device over an unreliable network as claimed in claim 11, wherein the fill frames in a frame queue are replaced by actual frames that arrive later for improving an accuracy of subsequent frames to be generated using real-time time series data.

13. A method for low-latency communication from a first device to a second device over an unreliable network as claimed in claim 1, wherein the method comprises training the at least one predictive machine learning model with specific stream content.

14. A method for low-latency communication from a first device to a second device over an unreliable network as claimed in claim 13, wherein the method comprises associating a bundle model with the specific stream content, different input frame sizes and output frames into one package based on the second device's computing capability.

15. A method for low-latency communication from a first device to a second device over an unreliable network as claimed in claim 1, wherein the method comprises generating a confidence score of a quality of the at least one regenerated frame of time series data regenerated by the at least one predictive machine learning model, wherein the at least one regenerated frame of time series data with high confidence score beyond a specified confidence threshold is reused in a subsequent fill-frame generation.

16. A computer program product comprising a non-transitory computer readable medium containing program instructions for execution by a computer, the execution of the program instructions by the computer configured to cause the first device and the second device to carry out the method of claim 1.

17. A first device that enables low-latency communication with a second device over an unreliable network using at least one predictive machine learning model, the first device comprising:
one or more processors;
one or more non-transitory computer-readable mediums storing one or more sequences of instructions, which when executed by the one or more processors, cause:
representing at least one frame of time series data at the first device, wherein the time series data is a series of data points indexed in time order;
recording at least one output stream, a metadata associated with the at least one output stream, and a plurality of external inputs in an interaction recorder of the second device, wherein the at least one output stream comprises the at least one frame of time series data;
segmenting an image into at least one background area stream and at least one character-centered portion, wherein the at least one background area stream is captured from a plurality of users;
compressing the at least one character-centered portion of the image into a character focus stream;
training at least one predictive machine learning model for predictive frame regeneration by providing the at least one output stream from the interaction recorder as an input; and
transmitting results of the training or interactions, between the first device and the second device, in a time series to the second device.

18. A first device that enables low-latency communication with a second device over an unreliable network as claimed in claim 17, wherein the one or more processors is further configured to train the at least one predictive machine learning model with specific stream content.

19. A second device that enables low-latency communication with a first device over an unreliable network using at least one predictive machine learning model, the second device comprising:
one or more processors;
one or more non-transitory computer-readable mediums storing one or more sequences of instructions, which when executed by the one or more processors, cause:
receiving results of training or interactions in the time series, from the first device, wherein the results or interactions comprises a state space representation or a modified output stream of the at least one frame of time series data, wherein the state space representation comprises interactions between the first device and the second device;
detecting at least one lost frame of time series data using a frame of time series data from previously received frames;
regenerating the at least one lost frame of the time series data using the at least one predictive machine learning model based on the at least one output stream to obtain at least one regenerated frame of time series data; and
combining an output stream from an application stream with the at least one regenerated frame of time series data obtained from the at least one predictive machine learning model to obtain the modified output stream, wherein the application stream comprises the at least one frame of time series data.

20. A second device that enables low-latency communication with a first device over an unreliable network as claimed in claim 19, wherein the one or more processors is further configured to calibrate an acoustic model into a decoder, wherein the acoustic model enables the decoder to regenerate the at least one lost frame of the time series data from lost data.

21. A second device that enables low-latency communication with a first device over an unreliable network as claimed in claim 19, wherein the one or more processors is further configured to produce fill-frames using a different number of input frames as an input vector to the at least one predictive machine learning model to generate an output frame, wherein the output frame is of a different frame size.

22. A second device that enables low-latency communication with a first device over an unreliable network as claimed in claim 19, wherein the one or more processors is further configured to associate a bundle model with a specific stream content, different input frame sizes and output frames into one package based on its computing capability.

23. A second device that enables low-latency communication with a first device over an unreliable network as claimed in claim 19, wherein the one or more processors is further configured to generate a confidence score of a quality of the at least one regenerated frame of time series data regenerated by the at least one predictive machine learning model, wherein the at least one regenerated frame of time series data with high confidence score beyond a specified confidence threshold is reused in a subsequent fill-frame generation.

* * * * *